US012499584B2

(12) United States Patent
Marvie et al.

(10) Patent No.: US 12,499,584 B2
(45) Date of Patent: Dec. 16, 2025

(54) METHOD AND AN APPARATUS FOR ENCODING/DECODING AT LEAST ONE ATTRIBUTE OF AN ANIMATED 3D OBJECT

(71) Applicant: InterDigital CE Patent Holdings, SAS, Paris (FR)

(72) Inventors: Jean-Eudes Marvie, Betton (FR); Jean-Claude Chevet, Betton (FR); Yannick Olivier, Thorigne Fouillard (FR); Pierre Andrivon, Liffre (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 245 days.

(21) Appl. No.: 18/029,624

(22) PCT Filed: Sep. 21, 2021

(86) PCT No.: PCT/EP2021/075984
§ 371 (c)(1),
(2) Date: Mar. 30, 2023

(87) PCT Pub. No.: WO2022/069299
PCT Pub. Date: Apr. 7, 2022

(65) Prior Publication Data
US 2023/0386087 A1 Nov. 30, 2023

(30) Foreign Application Priority Data
Sep. 30, 2020 (EP) .................................... 20306126

(51) Int. Cl.
*G06T 9/00* (2006.01)
*H04N 21/81* (2011.01)
(52) U.S. Cl.
CPC .......... *G06T 9/001* (2013.01); *H04N 21/8146* (2013.01)

(58) Field of Classification Search
CPC ........................... G06T 9/001; H04N 21/8146
See application file for complete search history.

(56) References Cited

U.S. PATENT DOCUMENTS 8,291,069 B1 * 10/2012 Phillips ................... G06F 17/18
709/224
9,619,916 B2 * 4/2017 Steinke ................... G06T 13/00
(Continued)

FOREIGN PATENT DOCUMENTS

EP 2128822 A1 12/2009

OTHER PUBLICATIONS

Anonymous, "Draco 3D Data Compression", Draco Library Home Page; URL: https://google.github.io/draco/, 2 pages.
(Continued)

*Primary Examiner* — Ming Wu
(74) *Attorney, Agent, or Firm* — Condo Roccia Koptiw LLP

(57) ABSTRACT

A method, an apparatus for encoding at least one component of at least one attribute of an animated 3D object and a method and an apparatus for decoding at least one component of at least one attribute of an animated 3D object are disclosed. The at least one component of the at least one attribute of the animated 3D object is encoded by reframing values of the attributes into a first subset and a second subset, wherein the first subset of values comprises values of the at least one component being in a range of values, and the second subset of values comprising values of the at least one component being outside the range of values, and encoding the first subset and the second subset of values.

22 Claims, 20 Drawing Sheets

(56) References Cited

U.S. PATENT DOCUMENTS

| | | | | |
|---|---|---|---|---|
| 2007/0208792 | A1* | 9/2007 | Berjon | G06T 9/001 |
| | | | | 708/207 |
| 2009/0135921 | A1 | 5/2009 | Lei et al. | |
| 2012/0051655 | A1* | 3/2012 | Oto | G06V 10/469 |
| | | | | 382/199 |
| 2019/0132596 | A1* | 5/2019 | Sharman | H04N 19/45 |
| 2019/0191230 | A1* | 6/2019 | Li | H03M 7/46 |
| 2020/0210162 | A1* | 7/2020 | Howard | G06F 17/156 |
| 2020/0210726 | A1* | 7/2020 | Yang | G06V 10/70 |
| 2020/0213613 | A1* | 7/2020 | Hashimoto | H04N 19/57 |
| 2020/0302627 | A1* | 9/2020 | Duggal | G06N 20/00 |

OTHER PUBLICATIONS

Rossignac, Jarek, "Edgebreaker: Connectivity compression for triangle meshes", IEEE Transactions on Visualization and Computer Graphics, vol. 5, Issue: 1, Jan.-Mar. 1999, 15 pages.

Olivier et al., "PCC Multiple Missing Point Patches for TMC2", International Organization for Standardization, ISO/IEC JTC1/SC29/WG11, Coding of Moving Pictures and Audio, Document: MPEG2018/m44802, 124th Meeting, Oct. 2018, Macao, China, 4 pages.

Carranza et al., "Free-Viewpoint Video of Human Actors", Association for Computing Machinery (ACM), ACM Transactions on Graphics, vol. 22, Issue 3, Jul. 1, 2003, 9 pages.

Anonymous, "GlTF Specification", Khronos Group, gITF Version 1.0, Nov. 3, 2016, URL: https://github.com/KhronosGroup/gITF/tree/main/specification/1.0, 94 pages.

Maglo et al., "3D mesh compression: survey, comparisons and emerging trends", Association for Computing Machinery (ACM), ACM Computing Surveys, vol. 9, Issue No. 4, Article 39, Sep. 2013, 40 pages.

Touma et al., "Triangle Mesh Compression", Graphics Interface, 1998, URL: http://www.graphicsinterface.org/wp-content/uploads/gi1998-4.pdf, 9 pages.

Marvie et al., "[V-PCC] [EE2.6 related] Proposition of an anchor and a test model for coding animated meshes", International Organization for Standardization (ISO), Coding of Moving Pictures and Audio, ISO/IEC JTC1/SC29/WG 7, Document: m55327, Oct. 2020, Online presentation, 26 pages.

Vasa et al., "CODDYAC: Connectivity driven dynamic mesh compression", Institute of Electrical and Electronics Engineers (IEEE), 2007 3DTV Conference, Kos Island, Greece, May 7, 2007, 5 pages.

Rossignac et al., "3D compression made simple: Edgebreaker on a corner-table", Institute of Electrical and Electronics Engineers (IEEE), Proceedings International Conference on Shape Modeling and Applications, Genova, Italy, May 7, 2001, 7 pages.

Meyer et al., "On Floating-Point Normal Vectors", Eurographics Symposium on Rendering 2010, Computer Graphics Forum, vol. 29, Issue No. 4, Jun. 2010, 5 pages.

Anonymous, "Draco Bitstream Specification", Draco Library, Source Code Version 2, released Oct. 25, 2017, URL: https://google.github.io/draco/spec/, 47 pages.

Anonymous, "Draco Source Code", Draco Library, Source Code Version 1.5.3, released Jul. 6, 2022, URL: https://google.github.io/draco/, 15 pages.

Collet et al., "High-Quality Streamable Free-Viewpoint Video", ACM Transactions on Graphics, vol. 34, Issue No. 4, Article No. 69, Jul. 27, 2015, 13 pages.

Tourapis et al., "[V-PCC] Scalability support in V-PCC", International Organization for Standardization, Coding of Moving Pictures and Audio, ISO/IEC JTC1SC29/WG11, Document: MPEG2019/m52755, Jan. 2020, Brussels, Belgium, 14 pages.

Faramarzi et al., "Mesh Coding Extensions to MPEG-I V-PCC", Institute of Electrical and Electronics Engineers (IEEE), 2020 IEEE 22nd International Workshop on Multimedia Signal Processing (MMSP), Sep. 21, 2020, Tampere, Finland, 5 pages.

Yu et al., "Three-Dimensional Model Analysis and Processing", Springer Publishing, Advanced Topics in Science and Technology in China, Jan. 2010, Hangzhou, China, 434 pages.

Anonymous, "V-PCC Codec Description", International Organization for Standardization (ISO), Coding of moving pictures and audio, ISO/IEC JTC 1/SC 29WG 11, Document: N19332, Jun. 17, 2020, 73 pages.

* cited by examiner

| Reframe_flag | Radius |

FIG. 22

| Num_sparsePts | SparsePtsValues | SparsePtsIndex |

FIG. 23A

| Num_sparsePts | RfS | Radius' | SparsePtsValues | SparsePtsIndex |

FIG. 23B

METHOD AND AN APPARATUS FOR ENCODING/DECODING AT LEAST ONE ATTRIBUTE OF AN ANIMATED 3D OBJECT

CROSS REFERENCE TO RELATED APPLICATIONS

This application is a U.S. National Stage Application under 35 U.S.C. § 371 of International Patent Application No. PCT/EP2021/075984, filed Sep. 21, 2021, which is incorporated herein by reference.

This application claims priority to European Application No. 20306126.2, filed Sep. 30, 2020, which is incorporated herein by reference in its entirety.

TECHNICAL FIELD

The present embodiments generally relate to a method and an apparatus for encoding and decoding of animated mesh.

BACKGROUND

Free viewpoint video can be implemented in by capturing an animated model using to a set of physical capture devices (video, infra-red, . . . ) spatially dispatched. The animated sequence that is captured can then be encoded and transmitted to a terminal for being played from any virtual viewpoint with six degrees of freedom (6 dof). Different approaches exist for encoding the animated model. For instance, the animated model can be represented as image/video, point cloud, or textured mesh.

In the Image/Video based approach, a set of video stream plus additional meta-data is stored and a warping or any other reprojection is performed to produce the image from the virtual viewpoint at playback. This solution requires heavy bandwidth and introduces many artefacts.

In the point cloud approach, an animated 3D point cloud is reconstructed from the set of input animated images, thus leading to a more compact 3D model representation. The animated point cloud can then be projected on the planes of a volume wrapping the animated point cloud and the projected points (a.k.a. patches) encoded into a set of 2D coded video streams (e.g. using HEVC, AVC, VVC . . . ) for its delivery. This solution is for instance developed in the MPEG V-PCC standard ("ISO/IEC JTC1/SC29 WG11, w19332, V-PCC codec description," Alpbach, Austria, April 2020). However, the nature of the model is very limited in terms of spatial extension and some artefacts can appear, such as holes on the surface for closeup views.

In the textured mesh approach, an animated textured mesh is reconstructed from the set of input animated images such as in [1] A. Collet, M. Chuang, P. Sweeney, D. Gillett, D. Evseev, D. Calabrese, H. Hoppe, A. Kirk and S. Sullivan, "High-quality streamable free-viewpoint video," in *ACM Transaction on Graphics (SIGGRAPH)*, 2015, or in J. Carranza, C. Theobalt, M. A. Magnor and H.-P. Seidel, "Free-Viewpoint Video of Human Actors," in *ACM SIGGRAPH*, 2003 for instance. This kind of reconstruction usually passes through an intermediate representation as voxels or point cloud. A feature of meshes is that geometry definition can be quite low and photometry texture atlas can be encoded in a standard video stream. Point cloud solutions could require "complex" and "lossy" implicit or explicit projections (as in V-PCC) to obtain planar representation compatible with video based encoding approaches. In counterpart, textured meshes encoding relies on texture coordinates (UVs) to perform a mapping of the texture image to triangles of the mesh.

SUMMARY

According to an embodiment, a method for encoding at least one component of at least one attribute of an animated 3D object is provided. The method comprises reframing values of the at least one component of the at least one attribute into a first subset and a second subset, wherein the first subset of values comprises values of the at least one component being in a range of values, and the second subset of values comprising values of the at least one component being outside the range of values, and encoding the first subset and the second subset of values.

According to another embodiment, an apparatus for encoding at least one component of at least one attribute of an animated 3D object is provided, comprising one or more processors configured for reframing values of the at least one attribute into a first subset and a second subset, wherein the first subset of values comprises values of the at least one component being in a range of values, and the second subset of values comprising values of the at least one component being outside the range of values, and encoding the first subset and encoding the second subset of values.

According to another embodiment, a method for decoding at least one component of at least one attribute of an animated 3D object is provided, wherein decoding comprises decoding a first subset of values and a second subset of values, and reconstructing the at least one component of at least one attribute from the first subset and the second subset, wherein the first subset of values comprises values of the at least one component being in a range of values, and the second subset of values comprising values of the at least one component being outside the range of values.

According to another embodiment, an apparatus for decoding at least one component of at least one attribute of an animated 3D object is provided, comprising one or more processors configured for decoding a first subset of values and a second subset of values, and reconstructing the at least one attribute from the first subset and the second subset, wherein the first subset of values comprises values of the at least one component being in a range of values, and the second subset of values comprising values of the at least one component being outside the range of values.

According to another embodiment, a method for encoding/decoding a 3D object is provided comprising at least encoding/decoding at least one component of at least one attribute of the 3D object.

According to another embodiment, an apparatus for encoding/decoding a 3D object is provided, comprising one or more processors configured for at least encoding/decoding at least one component of at least one attribute of the 3D object.

According to another embodiment, a bitstream comprising coded of at least one attribute of an animated 3D object is provided, comprising coded video data representative of a first subset of values of at least one component of at least attribute of the animated 3D object, and coded metadata representative of a second subset of values of the at least one component of the at least one attribute of the animated 3D object, said at least one attribute being reframed into the first subset and the second subset of values, wherein the first subset of values comprises values of the at least one component being in a range of values, and the second subset of values comprising values of the at least one component being outside the range of values.

One or more embodiments also provide a computer program comprising instructions which when executed by one or more processors cause the one or more processors to perform any one of the encoding methods or decoding methods according to any of the embodiments described above. One or more of the present embodiments also provide a computer readable storage medium having stored thereon instructions for encoding or decoding a 3D object or at least one component of at least one attribute of an animated 3D object according to the methods described above. One or more embodiments also provide a computer readable storage medium having stored thereon a bitstream generated according to the methods described above. One or more embodiments also provide a method and apparatus for transmitting or receiving the bitstream generated according to the methods described above.

BRIEF DESCRIPTION OF THE DRAWINGS

FIG. 22 illustrates an example of a part of a bitstream according to an embodiment.

FIG. 23A illustrates an example of a metadata encoded for the second subset, according to an embodiment.

FIG. 23B illustrates an example of a metadata encoded for the second subset, according to another embodiment.

DETAILED DESCRIPTION

Figure 1:
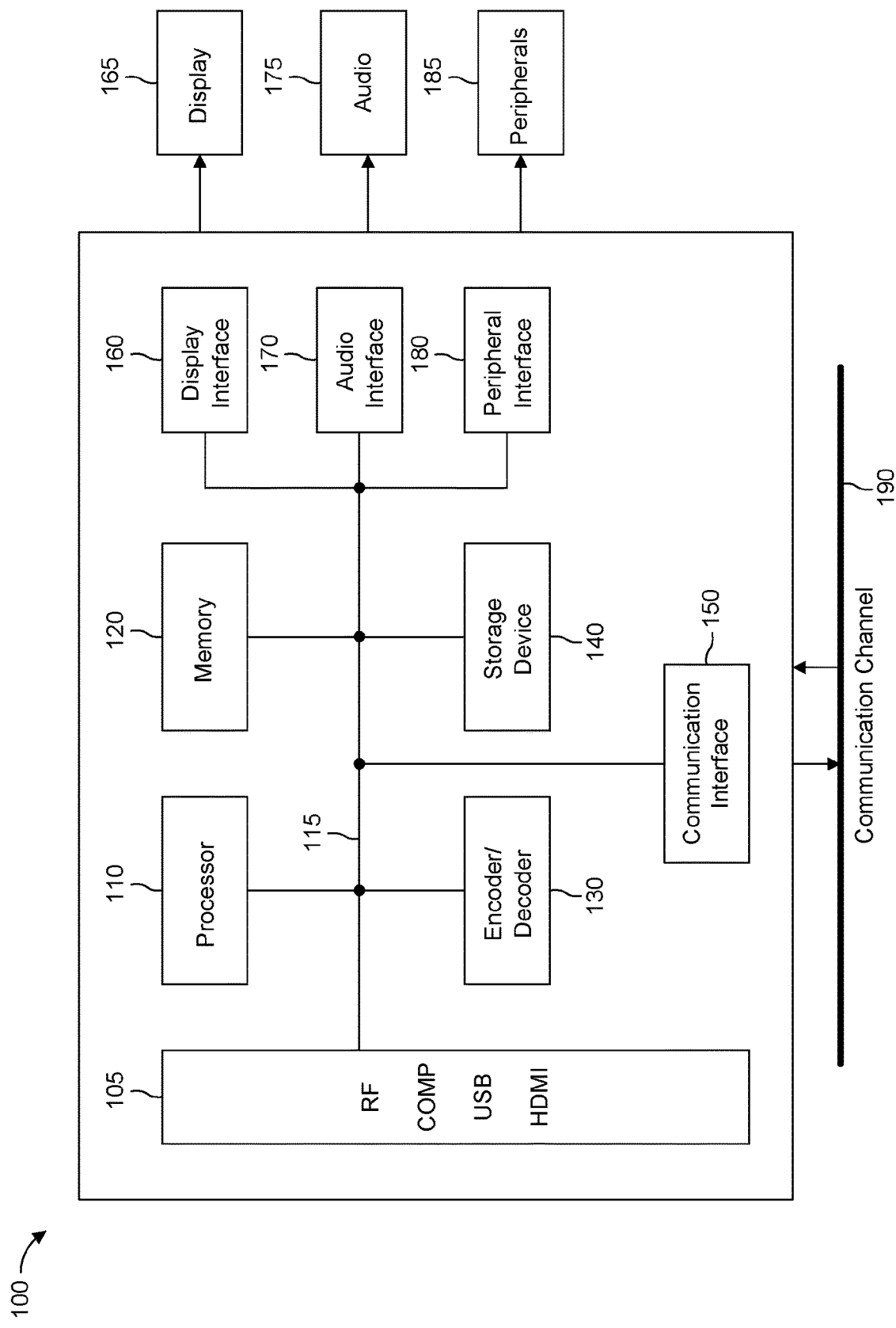
FIG. 1 illustrates a block diagram of a system within which aspects of the present embodiments may be implemented.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the data stream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV.Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

Figure 2:
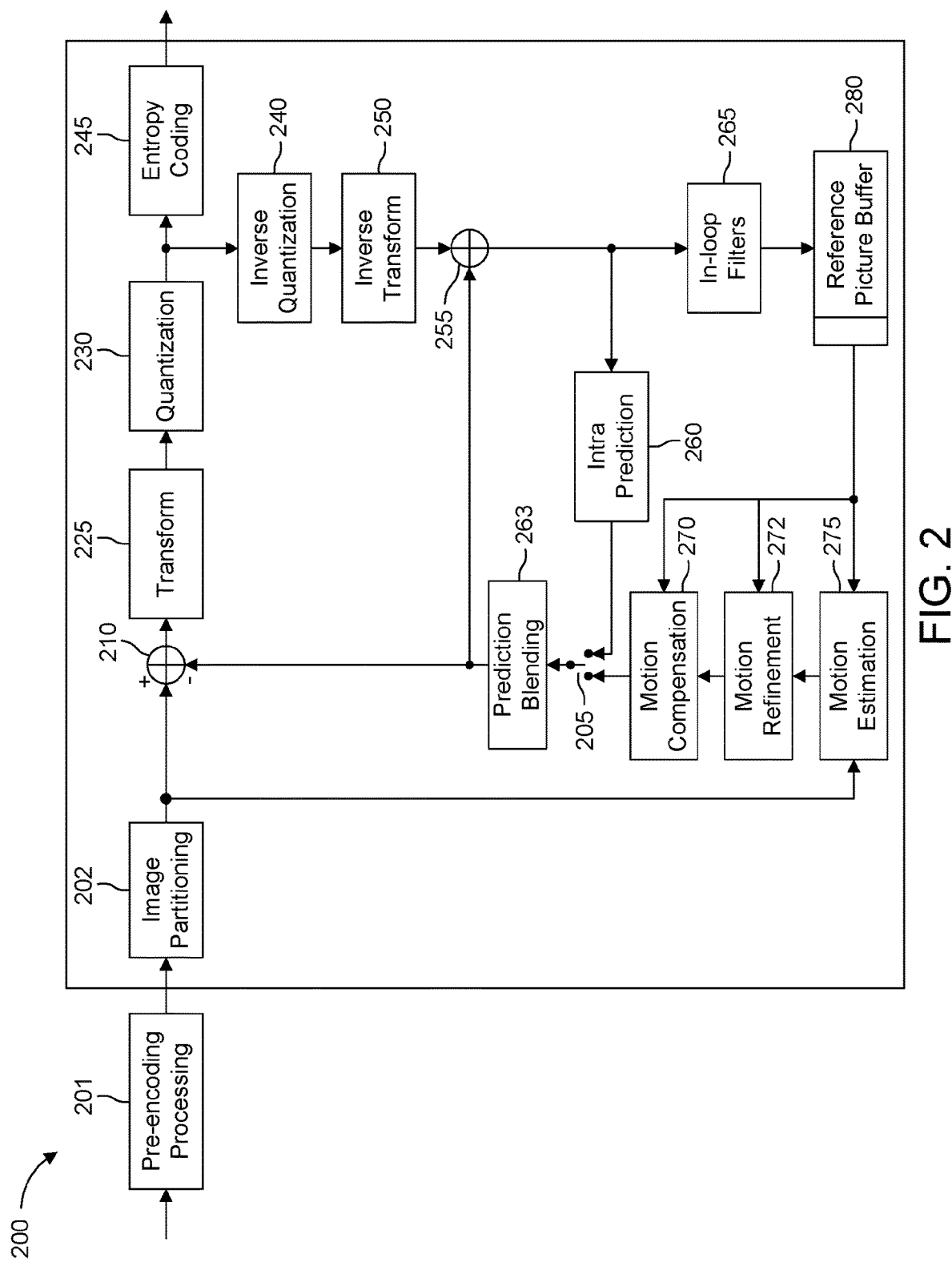
FIG. 2 illustrates a block diagram of an embodiment of a video encoder.

FIG. 2 illustrates an example video encoder 200, such as a High Efficiency Video Coding (HEVC) encoder, that can be used for encoding one or more attributes of an animated mesh according to an embodiment. FIG. 2 may also illustrate an encoder in which improvements are made to the HEVC standard or an encoder employing technologies similar to HEVC, such as a VVC (Versatile Video Coding) encoder under development by JVET (Joint Video Exploration Team).

In the present application, the terms "reconstructed" and "decoded" may be used interchangeably, the terms "encoded" or "coded" may be used interchangeably, the terms "pixel" or "sample" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence may go through pre-encoding to processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 200, a picture is encoded by the encoder elements as described below. The picture to be encoded is partitioned (202) and processed in units of, for example, CUs. Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. The encoder may also blend (263) intra prediction result and inter prediction result, or blend results from different intra/inter prediction methods.

Prediction residuals are calculated, for example, by subtracting (210) the predicted block from the original image block. The motion refinement module (272) uses already available reference picture in order to refine the motion field of a block without reference to the original block. A motion field for a region can be considered as a collection of motion vectors for all pixels with the region. If the motion vectors are sub-block-based, the motion field can also be represented as the collection of all sub-block motion vectors in the region (all pixels within a sub-block has the same motion vector, and the motion vectors may vary from sub-block to sub-block). If a single motion vector is used for the region, the motion field for the region can also be represented by the single motion vector (same motion vectors for all pixels in the region).

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

Figure 3:
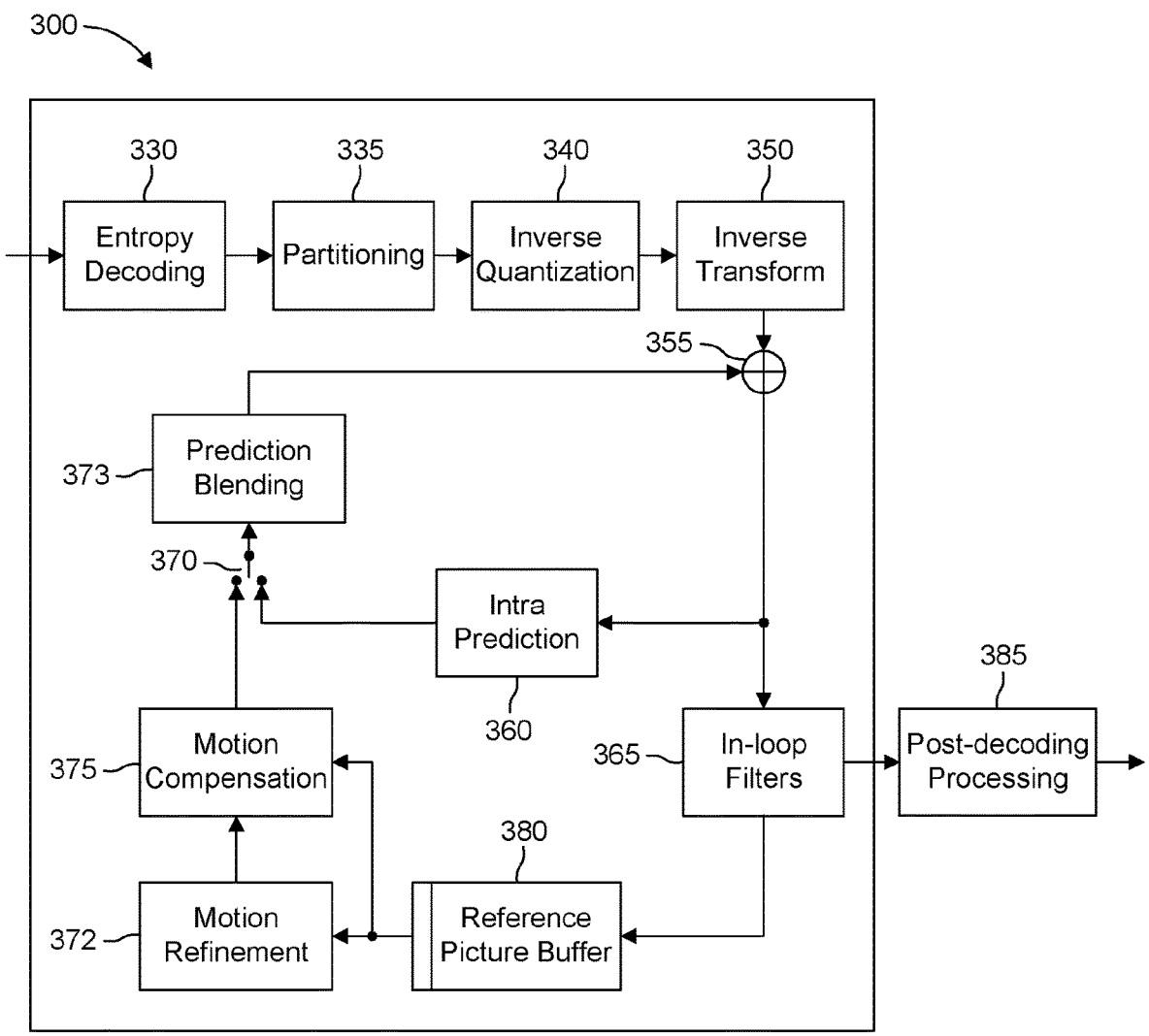
FIG. 3 illustrates a block diagram of an embodiment of a video decoder.

FIG. 3 illustrates a block diagram of an example video decoder 300, that can be used for decoding one or more attributes of an animated mesh according to an embodiment. In the decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which can be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed.

The predicted block can be obtained (370) from intra prediction (360) or motion-compensated prediction (i.e., inter prediction) (375). The decoder may blend (373) the intra prediction result and inter prediction result, or blend results from multiple intra/inter prediction methods. Before motion compensation, the motion field may be refined (372) by using already available reference pictures. In-loop filters (365) are applied to the reconstructed image. The filtered image is stored at a reference picture buffer (380).

The decoded picture can further go through post-decoding processing (385), for example, an inverse color transform (e.g. conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream.

The present application provides various embodiments for encoding/decoding one or more attributes of an animated 3D object. According to an embodiment, the 3D object is represented as an animated point cloud or an animated 3D mesh. The following embodiments are described in the case of a 3D object represented as a 3D mesh. The 3D mesh can be derived from a point cloud of the 3D object.

A mesh comprises at least the following features: a list of vertices or a list of vertices positions, a topology defining the connection between the vertices, for instance a list of faces, and optionally texture data, such texture atlases, or color values associated to vertices.

According to an embodiment, video-based coding/decoding is used for encoding/decoding at least one component of at least one attribute of the vertex of the animated mesh. By attribute of the vertex, it is referred here to attributes associated to each vertex of the mesh, such as vertex's position (x,y,z) in the 3D space, also referred to geometry coordinates, texture coordinates (U,V) in the texture atlas associated to vertex, normal associated to vertex, color associated to vertex or generic attribute. Some attribute may have only one component, others attributes may have several components.

An example of an end-to-end chain for encoding and transmitting an animated textured mesh is presented in [1]. In this scheme, meshes are tracked over time such that the topology of the meshes is consistent. Texture atlases are encoded as video frame, using an H.264 based encoder. The mesh is encoding by splitting the mesh sequence into a series of keyframes and predictive frames. The keyframe meshes contain both geometry and connectivity information. The geometric information (vertex positions and UV coordinates) quantized to 16 bits is encoded. Connectivity information is delta-encoded using variable-byte triangle strip. The predictive frames contain only delta geometry information. Linear motion predictor is used to compute the delta geometry, which is then quantized and compressed with Golomb coding. In [1], the mesh is encoded as meta-data and not using video coding schemes.

In J. Rossignac, "Edgebreaker: Connectivity compression for triangle meshes," GVU center, Georgia Institute of Technology, 1999 and in J. Rossignac, "3D compression made simple: Edgebreaker with ZipandWrap on a cornertable," in *Proceedings International Conference on Shape Modeling and Applications*, Genova, Italy, 2001, implementations of a scheme called EdgeBreaker, for encoding static meshes are proposed. Edgebreaker provides an algorithm to encode static mesh topology as spiraling triangle-strips over the mesh topology. The tri-strip chains topology is coded using a very short code and the attributes of the vertices that are visited (position, UVs, normal, colors) through the process are delta-encoded. The delta-encoded attribute tables are then compressed with the use of any entropy coder. The input data structure of the algorithm is a corner table representation of the input mesh.

The EdgeBreaker algorithm uses a so-called CLERS table. Edgebreaker visits the triangles in a spiraling (depth-first) triangle-spanning-tree order and generates a string of descriptors, one per triangle, which indicate how the mesh can be recreated by attaching new triangles to previously reconstructed ones. A characteristic of Edgebreaker lies in the fact that all descriptors are symbols from the set {C,L,E,R,S}. No other parameter is needed. Because half of the descriptors are Cs, a trivial code (C=0, L=110, E=111, R=101, S=100) guarantees an average of 2 bits per triangle.

Vertices of the mesh are delta-encoded. Edgebreaker compression stores a point and a sequence of corrective vectors in a string called delta, using WRITE(delta, D) statements, where D is a point or vector. The corrective vectors are encoded using a variable length binary format in a separate postprocessing entropy-compression step. During decompression, the first call READ(delta) returns a decoded version of the first vertex. Subsequent calls to READ(delta) return corrective vectors, which are added to the vertex estimates.

When the tip vertex of a new triangle has not yet been visited, then the triangle is a C triangle and the corrective vector for the tip vertex of the current triangle is delta encoded using a parallelogram rule as explained in C. Touma and C. Gotsman, "Triangle Mesh Compression," in *Graphics Interface*, 1998.

In Google, "Draco 3D graphics compression," 2017-2020 ([Online] Available: https://google.github.io/draco/), a library for compression of static point clouds and static meshes, called Draco, is presented. For static meshes, the library relies on cutting edge implementations of the Edgebreaker algorithm. The system proposes three levels of compression {CL0, CL4, CL10}, mainly guiding the compression speed with a direct effect on compression ratio. The compression level effect is to choose the topology compression algorithm:

CL0: no Edgebreaker, simple topology encoding, very fast, low compression.
CL4: simple and fast implementation of Edgebreaker.
CL10: advanced and (slightly) slower implementation of Edgebreaker that is valence driven, most compact results.

Draco proposes quantization parameters for vertex positions (default qp=11), UVs (default qt=10), normals (default qn=7), colors (default qc=8) and generic (default qg=8). Default values are expressed in bits per component. The values can rise to 32 bits per component.

Figure 4:
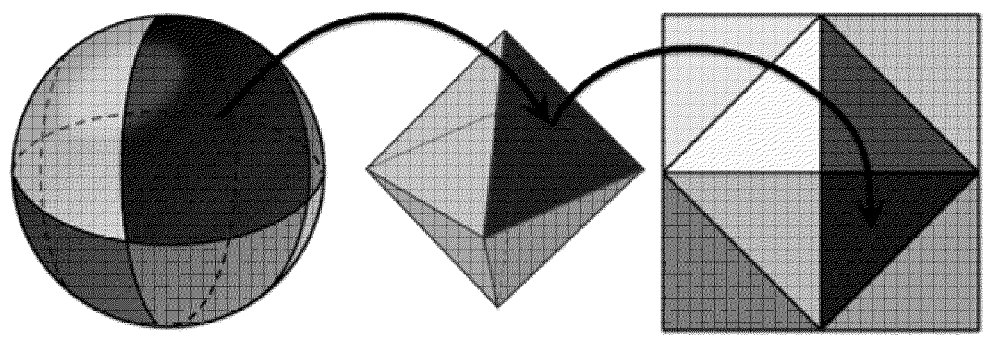
FIG. 4 illustrates an octahedral representation.

In Draco, the positions, UVs, colors and generic attributes are all delta encoded using a parallelogram rule. The normals, due to their normalized and spherical nature, are quantized using an octahedral representation as in Q. MEYER, J. SÜSSMUTH, G. SUSSNER, M. STAMMINGER and G. ANDGREINER, "On floating-point normal vectors," in *Proceedings of the 21st Eurographics conference on Rendering*, Aire-la-Ville, Switzerland, 2010, see FIG. 4. FIG. 4 illustrates an octahedral representation which maps the octants of a sphere to the faces of an octahedron. The faces of the octahedron are then projected to a plane unfolded into a unit square.

During the process of compression, the Draco implementation stores the CLERS chains in a specific table and the quantized attributes into respective tables. For positions, UVs, colors, and generic attributes, the quantized delta values are stored into memory as signed integers. For the normal, the quantized octahedral values are stored in memory as unsigned I,J coordinates. The attribute tables are finally entropy coded.

Figure 5:
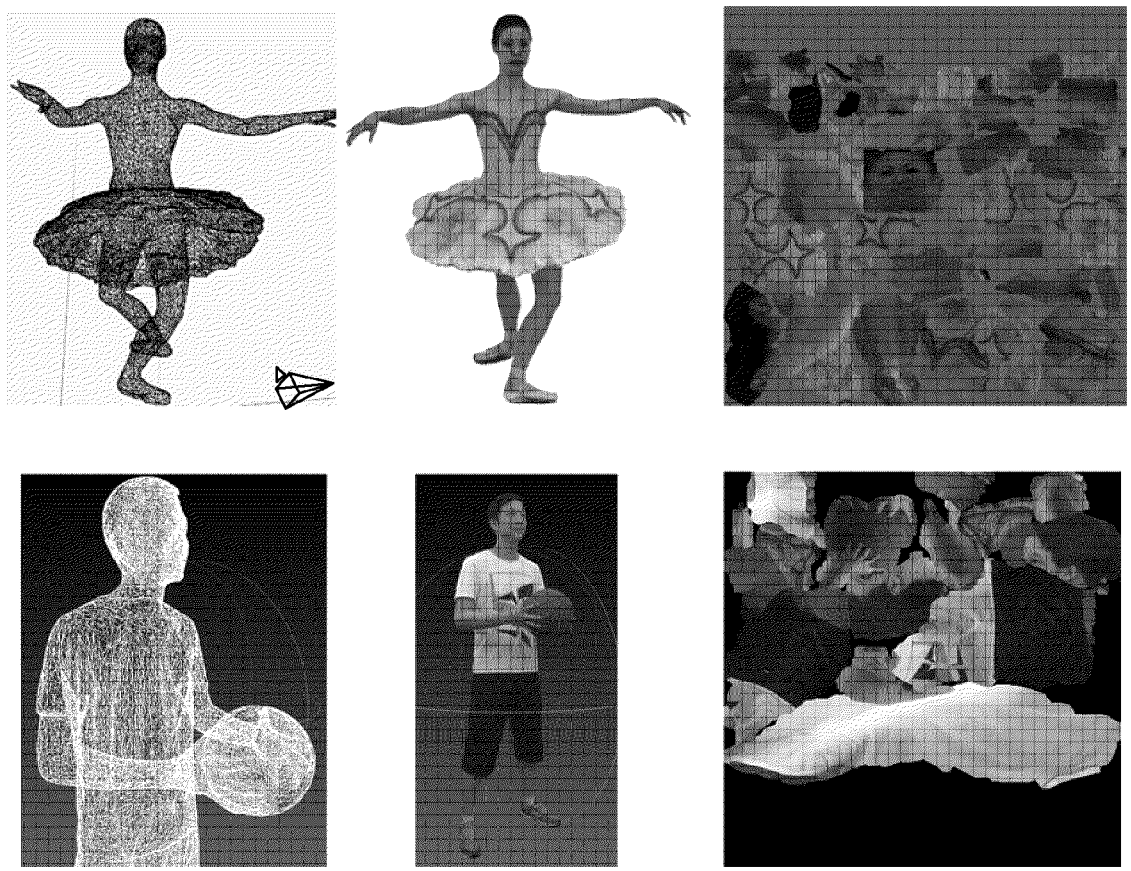
FIG. 5 illustrates examples meshes with corresponding 3D objects and texture atlas.

FIG. 5 illustrates example meshes with corresponding 3D objects and texture atlas. Top of FIG. 5 shows a frame of an animated ballerina model provided by Microsoft®, for which mesh tracking has been used, and a corresponding stabilized texture atlas over time is provided. Bottom of FIG. 5 illustrates a frame of an animated basketball player provided by Owlii® where no mesh tracking is used.

Figure 6:
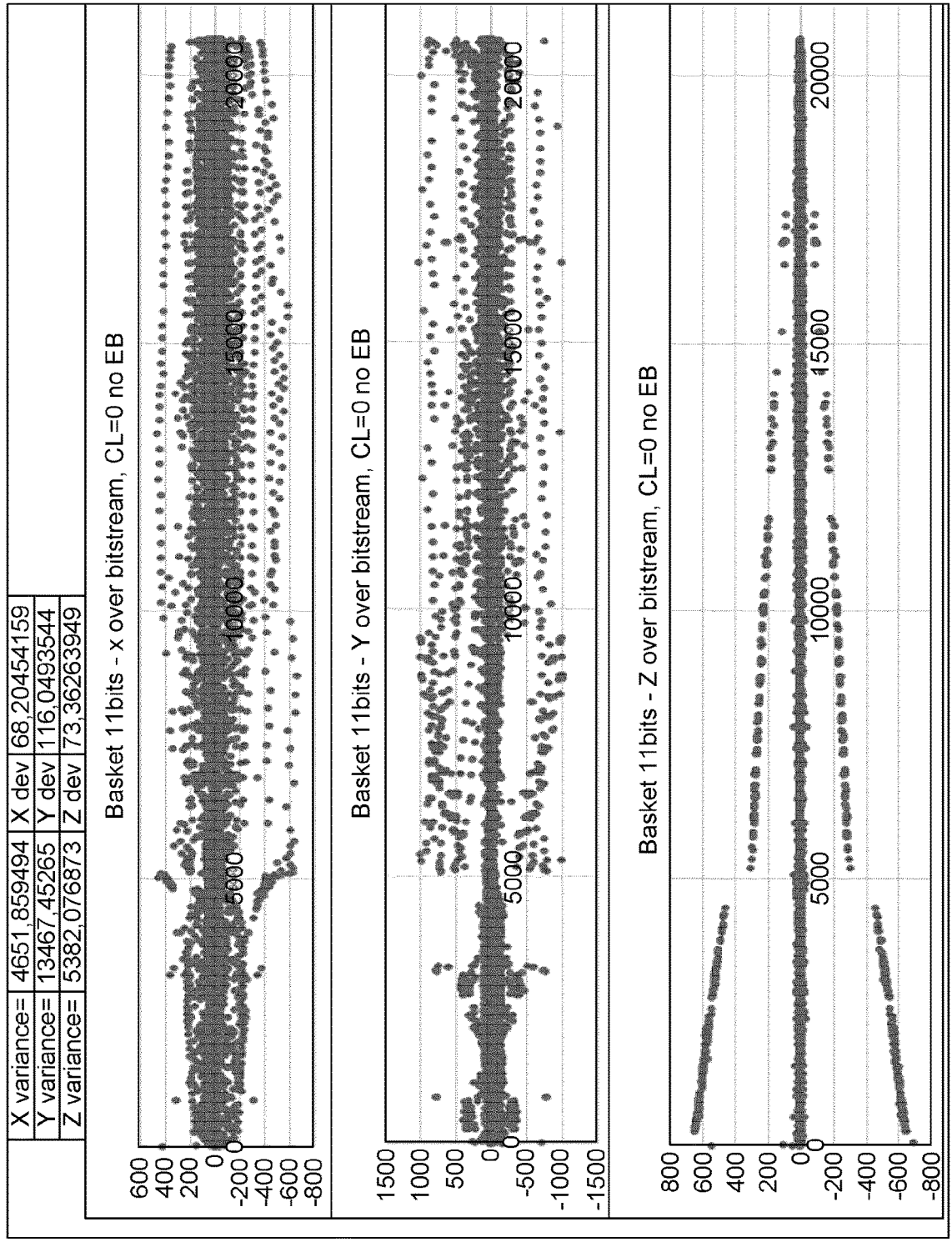
FIG. 6 illustrates an evolution of the positions attribute for a given frame of the Basketball player model using Draco with CL=0 (no EdgeBreaker).

FIG. 6 illustrates an evolution of the positions attribute for a given frame of the Basketball player model using Draco with CL=0 (no EdgeBreaker). The x axis is the index of the sample in the attribute table. The y axis is respectively the x, y and z coordinate. As the EdgeBreaker is not used, the attributes (x,y,z) are expressed in global coordinates.

Figure 7:
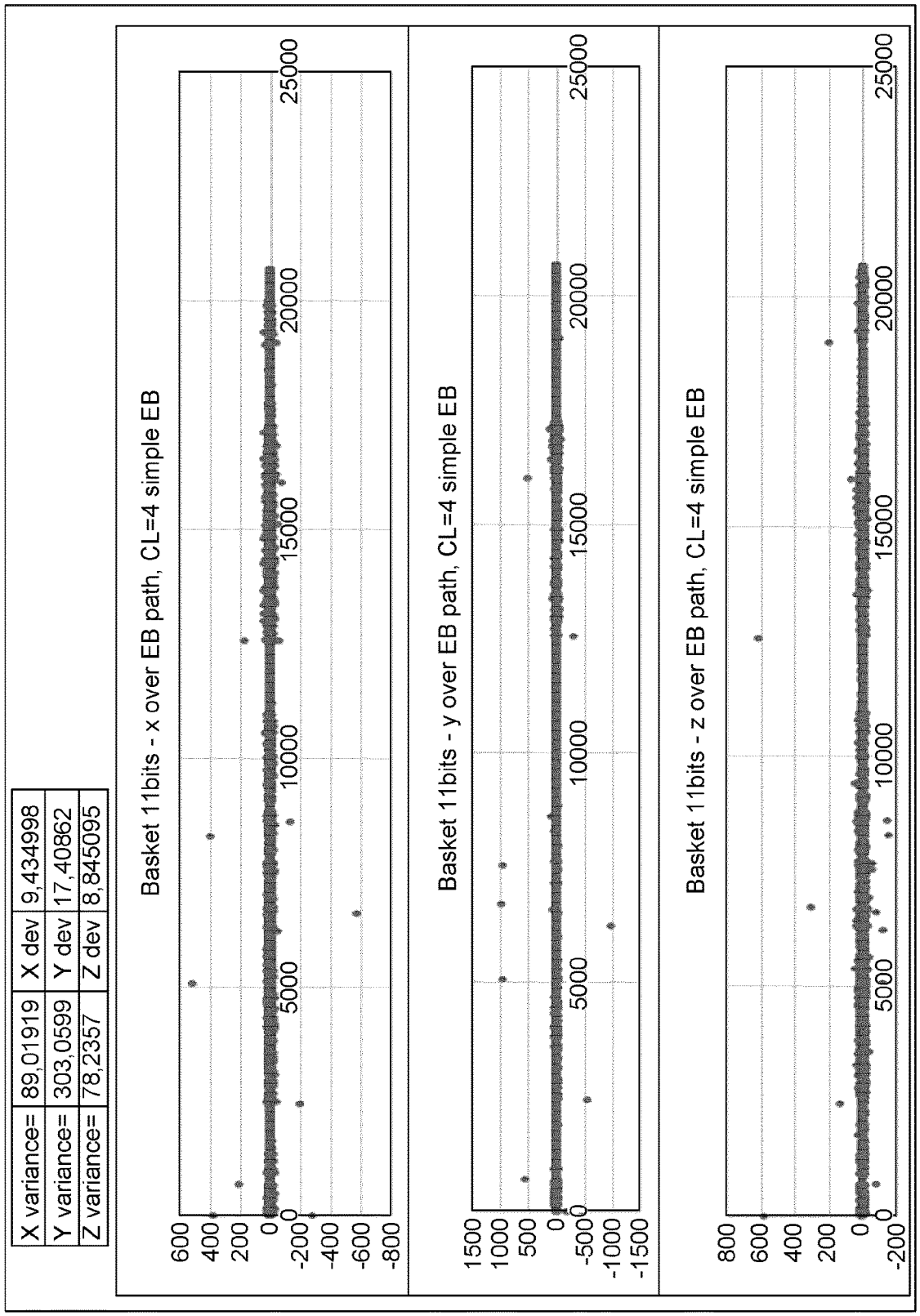
FIG. 7 illustrates an evolution of the position' deltas for a given frame of the Basketball player model using Draco with CL=4 (with EdgeBreaker).

FIG. 7 illustrates an evolution of the position' deltas for a given frame of the Basketball player model using Draco with CL=4 (with EdgeBreaker). The x axis is the index of the delta value in the attribute table. The y axis is respectively the x-delta, the y-delta and the z-delta.

Figure 8:
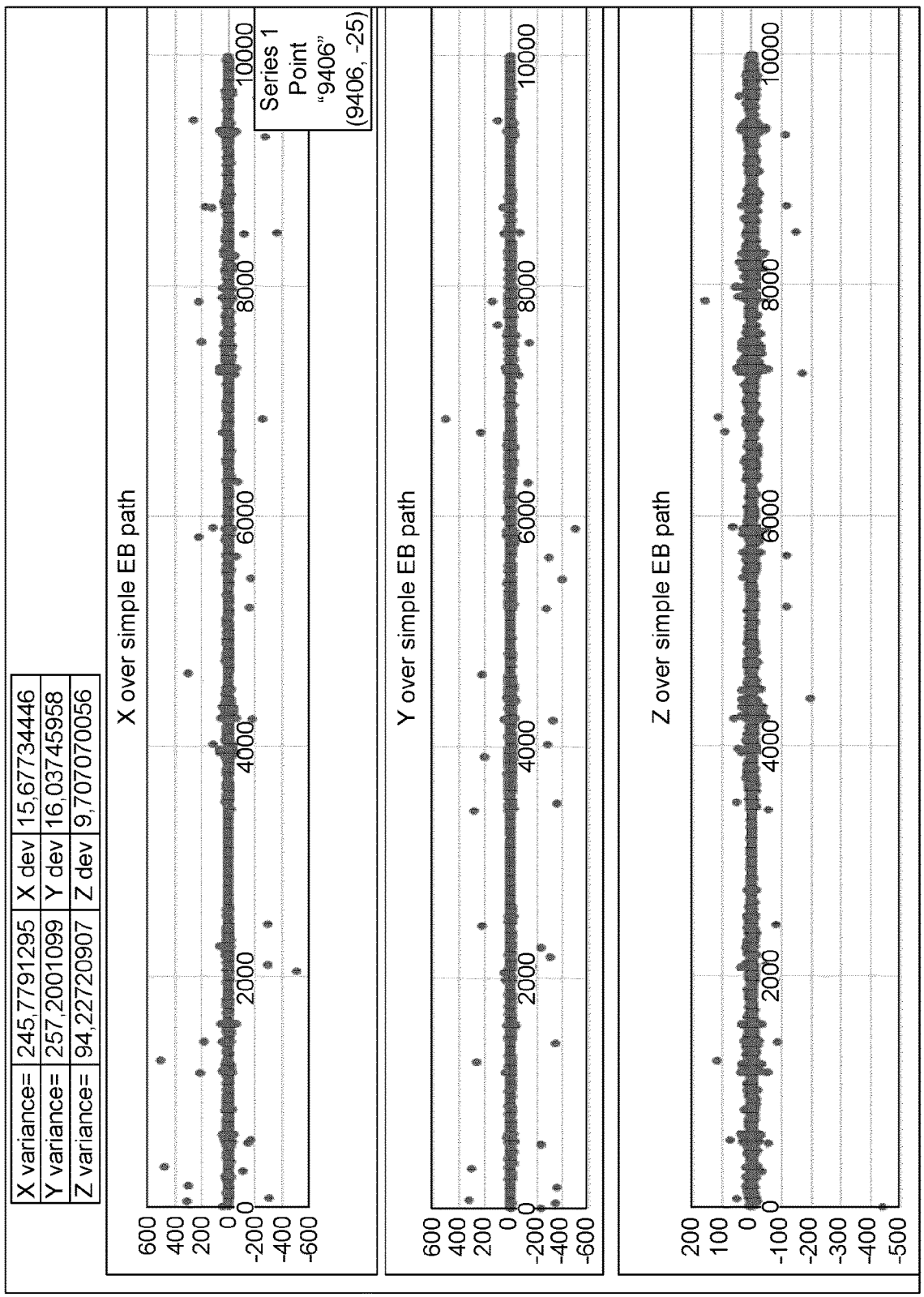
FIG. 8 illustrates an evolution of the position' deltas for a given frame of the Ballerina model using Draco with CL=4 (with EdgeBreaker).

FIG. 8 illustrates an evolution of the position' deltas for a given frame of the Ballerina model using Draco with CL=4 (with EdgeBreaker). The x axis is the index of the delta value in the attribute table. The y axis is respectively the x-delta, the y-delta and the z-delta.

Figure 9:
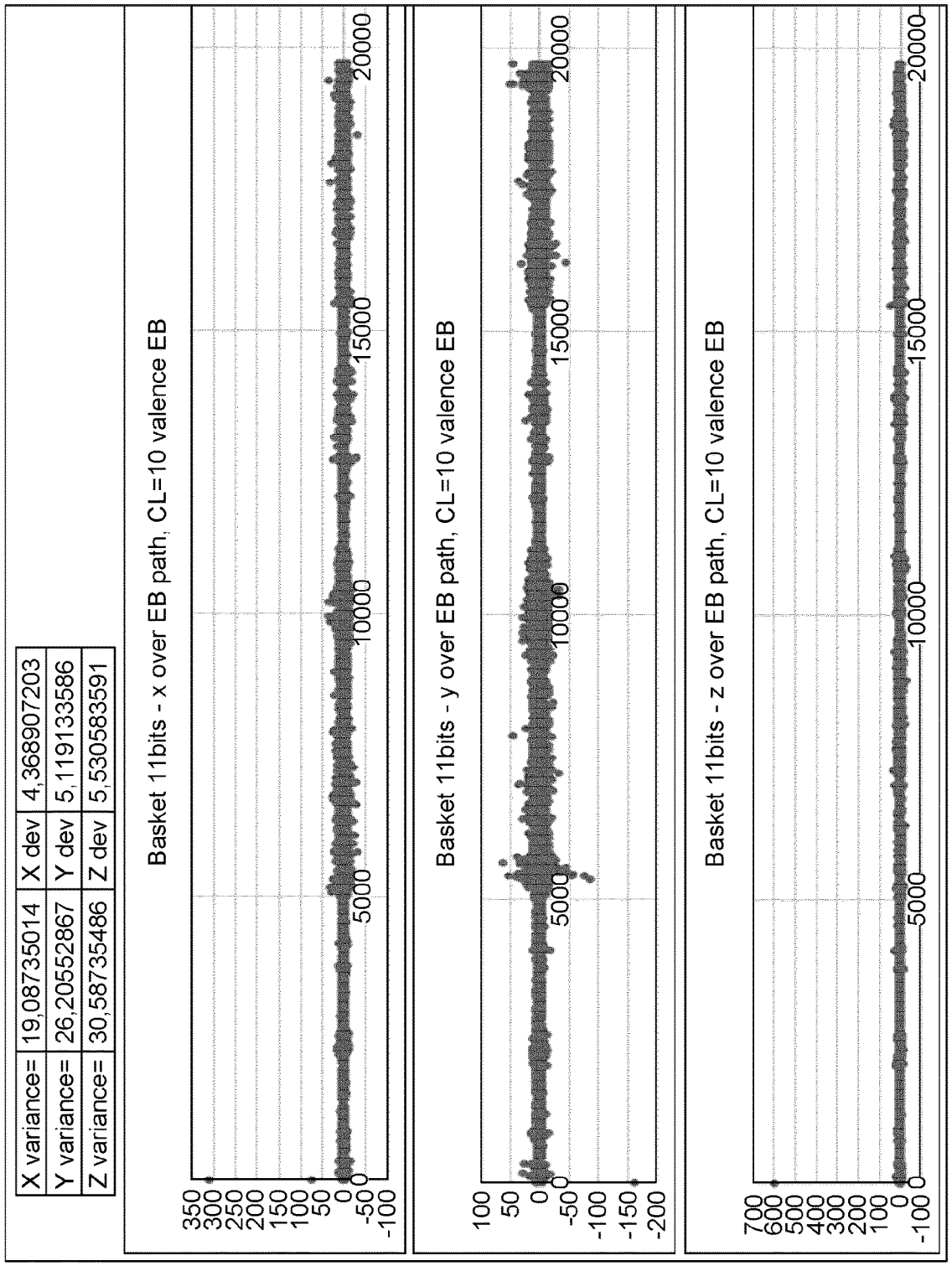
FIG. 9 illustrates an evolution of the position' deltas for a given frame of the Basketball player model using Draco with CL=10 (with EdgeBreaker valence driven).

FIG. 9 illustrates an evolution of the position' deltas for a given frame of the Basketball player model using Draco with CL=10 (with EdgeBreaker valence driven). The x axis is the index of the delta value in the attribute table. The y axis is respectively the x-delta, the y-delta and the z-delta.

Figure 10:
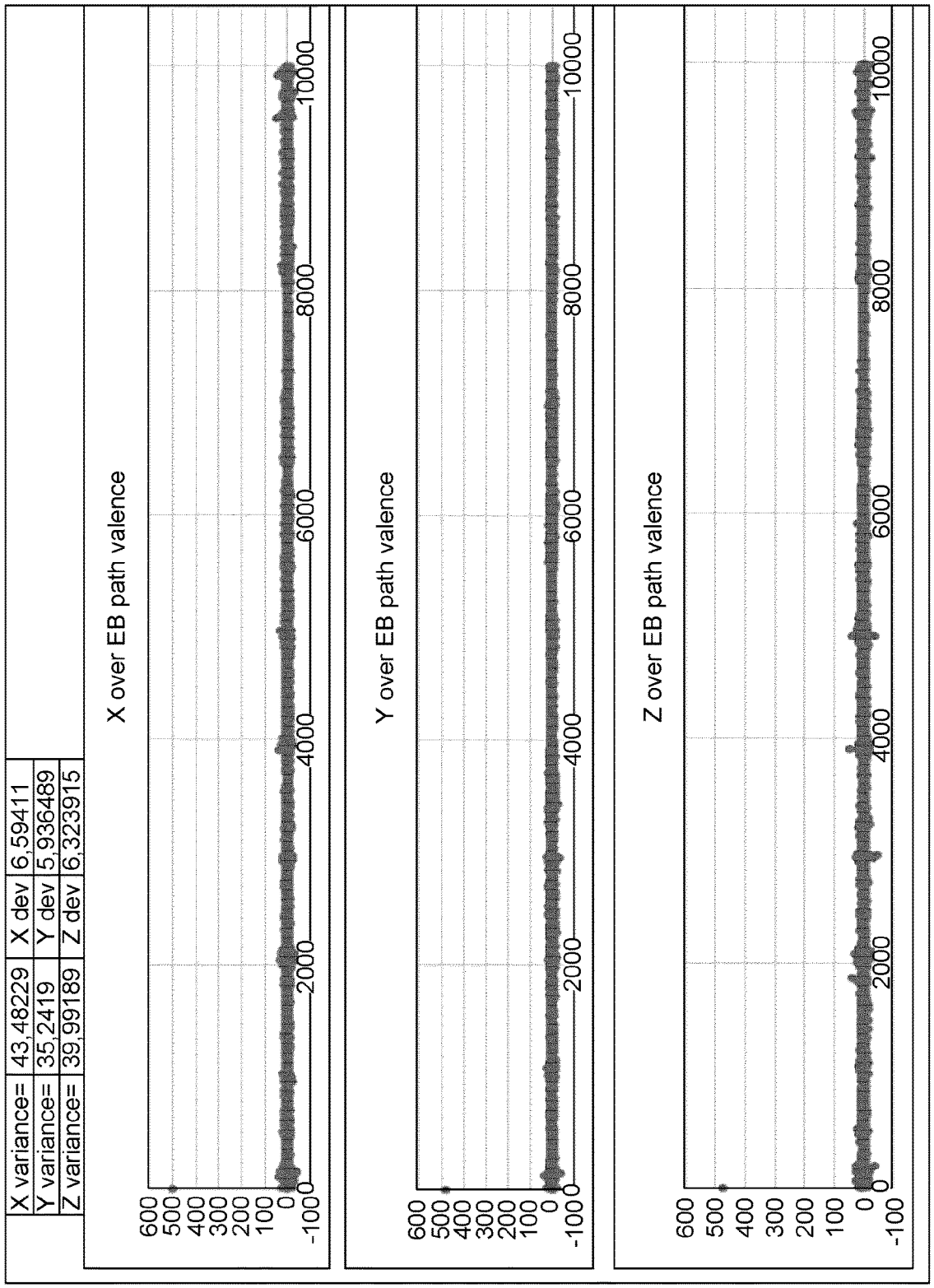
FIG. 10 illustrates an evolution of the position' deltas for a given frame of the Ballerina model using Draco with CL=10 (with EdgeBreaker valence driven).

FIG. 10 illustrates an evolution of the position' deltas for a given frame of the Ballerina model using Draco with CL=10 (with EdgeBreaker valence driven). The x axis is the index of the delta value in the attribute table. The y axis is respectively the x-delta, the y-delta and the z-delta.

A default quantization of 11 bits per component has been used for the BasketBall player model and 10 bits per component for the Ballerina model. FIG. 6 shows a quite important disparity of samples, i.e. the variance is high. Having a high variance means that data is not very suitable for mapping to spatial coherence-based encoders. FIG. 6 also shows that the deviation is also quite high, which means that the entirety of the quantization space (the 10 or 11 bits) is mandatory to encode the signal.

Table 1 below illustrates a summary of variance and deviations for the basketball and ballerina position attribute signals obtained when using different configurations of Draco for encoding the animated mesh models.

TABLE 1

| | Basketball player | | | Ballerina | |
| --- | --- | --- | --- | --- | --- |
| | CL = 0 | CL = 4 | CL = 10 | CL = 4 | CL = 10 |
| X variance | 4651 | 89 | 19 | 245 | 43.48 |
| Y variance | 13467 | 303 | 26.2 | 257 | 35.2 |
| Z variance | 5382 | 78 | 30.5 | 94.2 | 39.9 |
| X deviation | 68.2 | 9.4 | 4.3 | 15.6 | 6.5 |
| Y deviation | 116 | 17.4 | 5.1 | 16 | 5.9 |
| Z deviation | 73.3 | 8.8 | 5.5 | 9.7 | 6.3 |

FIGS. 7 and 8 show that the variance, when using delta-encoding for the mesh, is much lower. Only few sparse points can be seen. This means that even if the overall signal is noisy, the noise is very compact and flat, i.e. having small variations. The signal is thus suitable for video encoding in terms of spatial coherence. In addition, the deviation is also much lower which means that most of the signal could be encoded on less than the original range of 10 or 11 bits.

For FIGS. 9 and 10, only the first point (which is the start of the chain) is an absolute value, all the other samples are valence driven delta that consumes very few bits. Furthermore, the deviation for this signal is around 6 which is extremely low and means that these values (minus the absolute one) can be re-encoded on a smaller bit range. The Draco configuration with CL=10 provides a signal that is even more suitable than the CL=4 for video coding in terms of spatial coherence.

Figure 11:
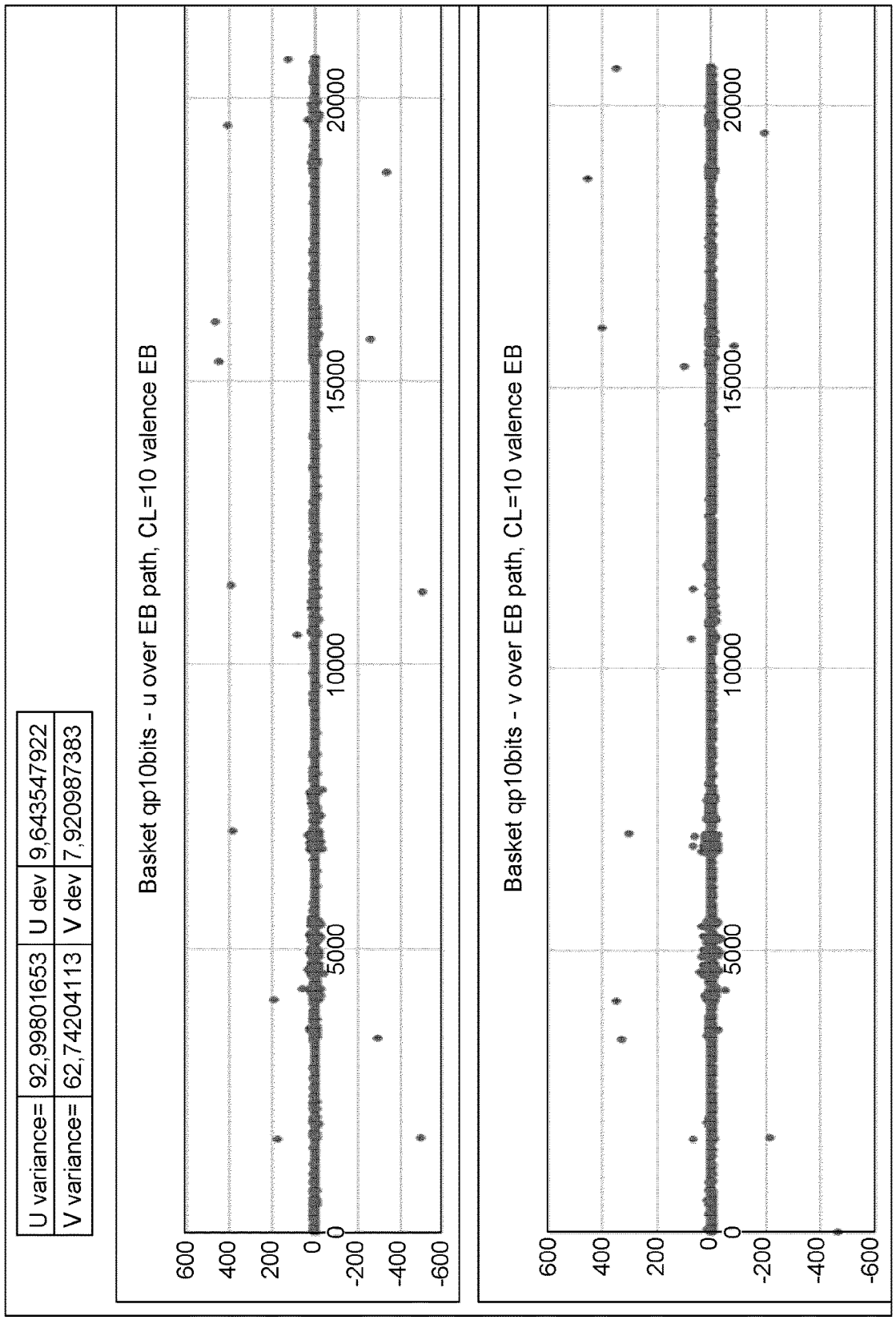
FIG. 11 illustrates an evolution of the UVs deltas for a given frame of the Basketball player model using Draco with CL=10 (with EdgeBreaker) and quantization step of 10 bits.
Figure 12:
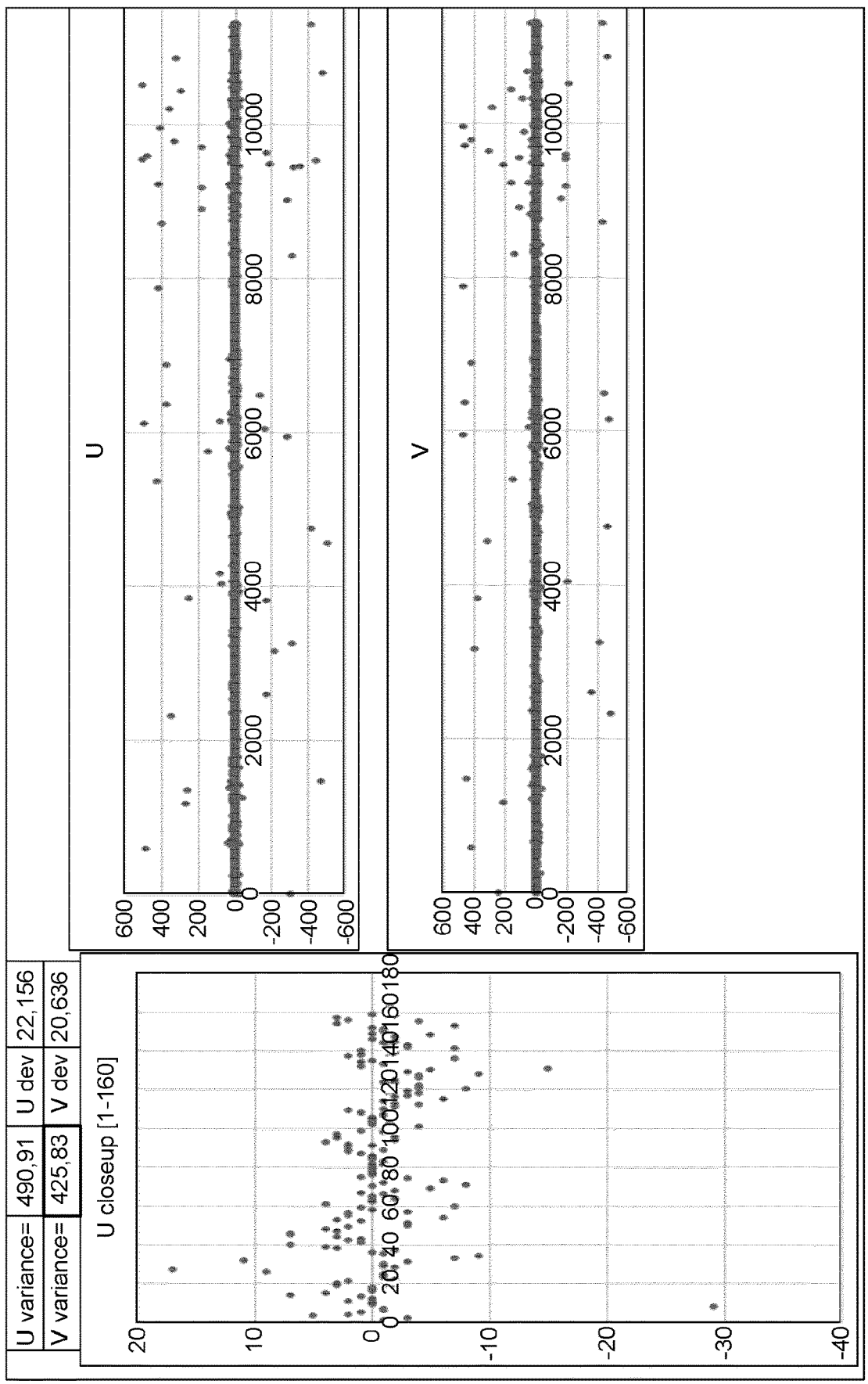
FIG. 12 illustrates an evolution of the UVs deltas for a given frame of the Ballerina model using Draco with CL=10 (with EdgeBreaker) and quantization step of 10 bits.

The UVs feature here stands for the texture coordinates that map the texture atlas to the faces of the mesh. The texture associated to each vertex is identified by the couple of U,V texture coordinates associated to the vertex. Table 2 provides a summary of the UV profiles presented in FIGS. 11 and 12 showing respectively an evolution of the UVs deltas for a given frame of the Basketball player model, respectively Ballerina model, using Draco with CL=10 (with EdgeBreaker) and quantization step of 10 bits. The x axis is the index of the delta value in the attribute table. The y axis is respectively the U-delta and the V-delta.

FIGS. 11 and 12 shows that CL=10 gives UV signals with same properties as shown for the geometry. However, the overall variance and deviations are slightly higher than for the geometry. This is because texture atlas implies jumps over the texture image, leading to wider UV-delta values on patch change. TABLE 2 is a summary of variance and deviations for the basketball and ballerina UV attribute signals for CL=10.

TABLE 2

| CL = 10 | Basketball player | Ballerina |
| --- | --- | --- |
| U variance | 92.9 | 490 |
| V variance | 62.74 | 425 |
| U deviation | 9.6 | 22 |
| V deviation | 7.9 | 20 |

It can be seen that the Ballerina Variance and Deviation values are one order higher to the basketball ones. Even if the ballerina benefits from Mesh Tracking that stabilizes the atlas over time, the atlas generation algorithm from [1] seems to generate smaller patches than the atlas generation algorithm not using mesh tracking, as illustrated in FIG. 5. This leads to more sparse UV deltas (higher deviation) and wider chain restarts, corresponding to the sparse points on the ballerina UV plots.

Figure 13:
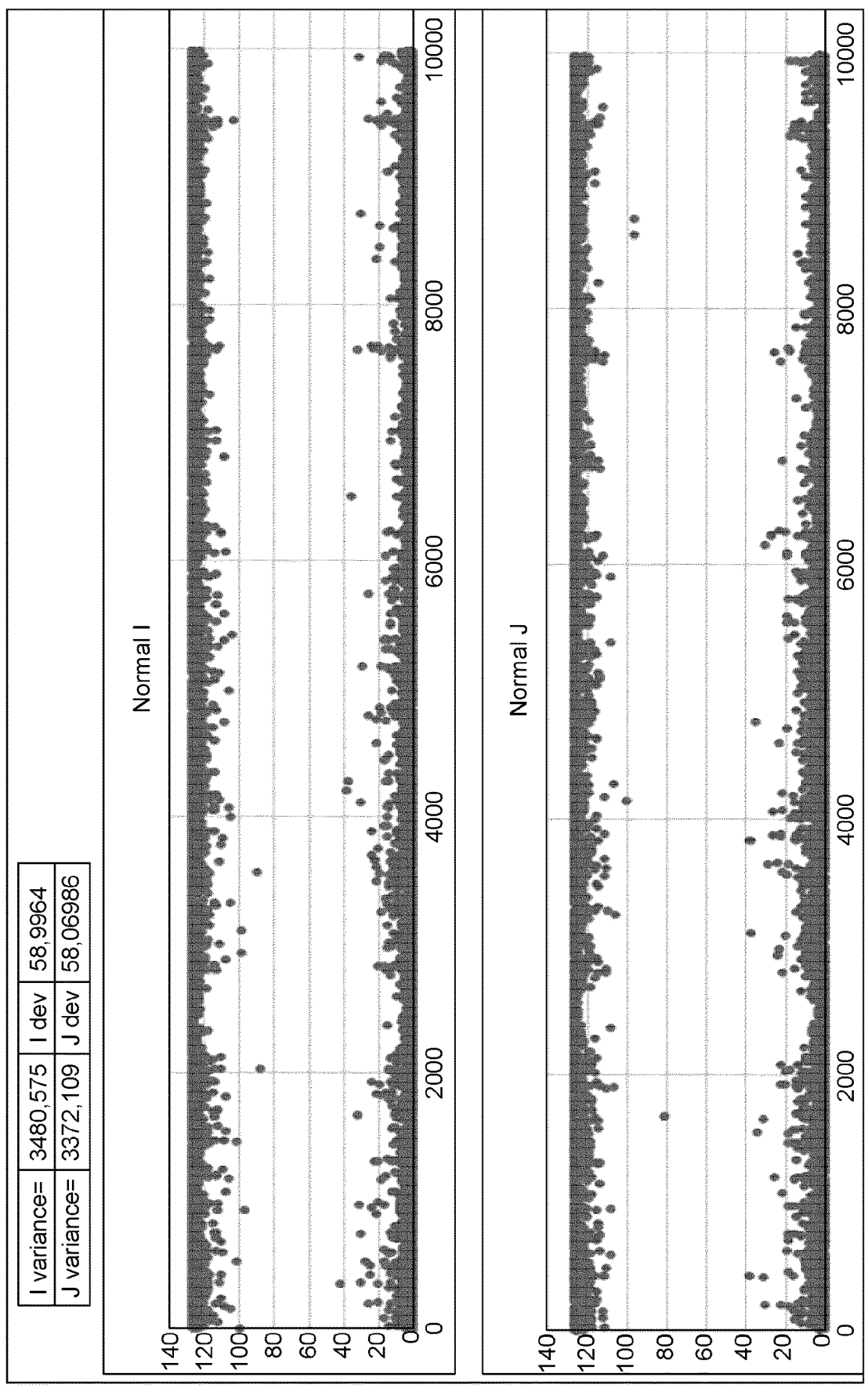
FIG. 13 illustrates an evolution of the normal in octahedron space for a given frame of the Ballerina model using Draco with CL=10 (with EdgeBreaker) and quantization step of 7 bits.

As explained above, in Draco, the normal vectors are not encoded as delta but rather as absolute value in octahedral representation. FIG. 13 shows the profile for normal evolution in octahedron space, for the ballerina model. The x axis is the index of the value in the attribute table, the y axis is respectively the I and the J values in the octahedron space.

FIG. 13 shows that the signal does not seem suitable for spatial compression due to a very high variance and deviations. The signal does not seem suitable for a quantization space reduction since the range extremes is in use. Nevertheless, FIG. 13 shows that the signal is split in two major parts (top and bottom).

Figure 14:
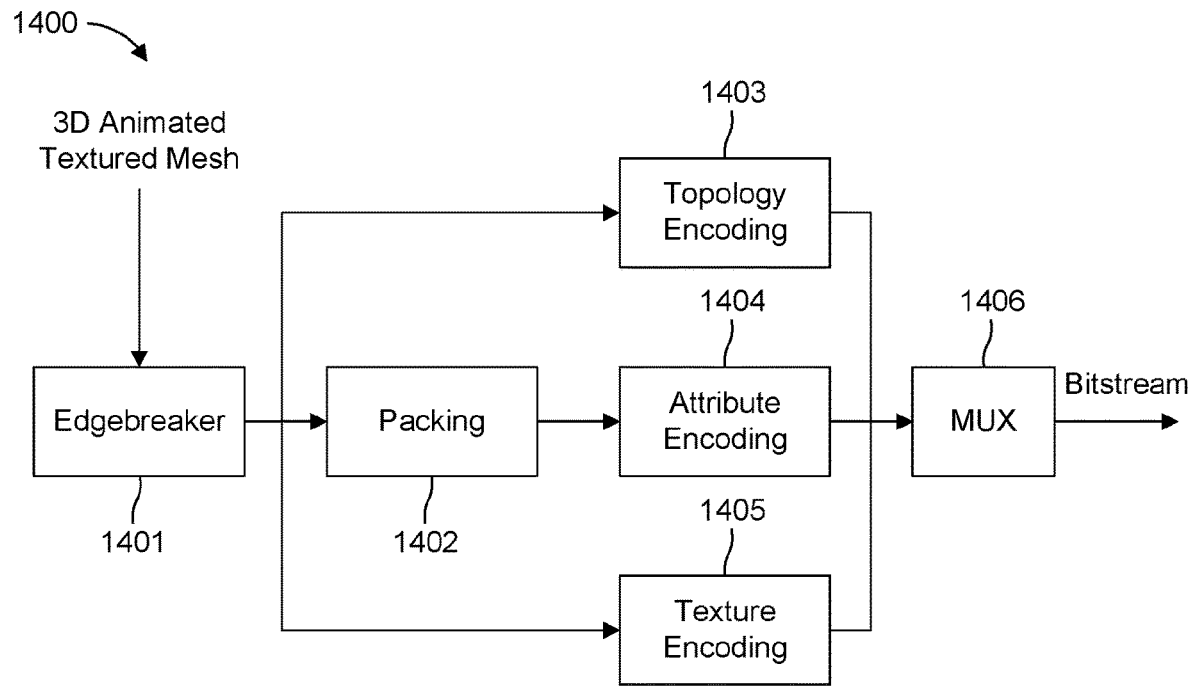
FIG. 14 illustrates an exemplary method for encoding a 3D object, according to an embodiment.

FIG. 14 illustrates an exemplary method 1400 for encoding a 3D object, according to an embodiment. According to this embodiment, the 3D object is an animated 3D textured mesh. According to another variant, the 3D object can be in any other format and transformed into an animated 3D mesh. For instance, the 3D object can be originally represented as a dynamic point cloud. The 3D points of the point cloud are further transformed into a 3D mesh representation.

By animated 3D mesh, it should be understood here a 3D mesh evolving over time, i.e. a sequence of 3D meshes wherein the vertex, and optionally the topology, evolves over time.

At 1401, A 3D animated textured mesh is input to an Edgebreaker-like algorithm [1, 4,5,7] which provides as output attributes of geometry, texture coordinates and normal as delta-tables as explained above. Eventually, as in [1], meshes can be stabilized over time before being input to the Edgebreaker-like algorithm. According to this variant, thus meshes are tracked over time such that the topology of the meshes is consistent.

At 1403, the topology resulting from the Edgebreaker algorithm is encoded. According to an embodiment, the topology is encoded as metadata. In other embodiments, the topology is packed into video frames and encoded as video data. According to a variant, the topology only changes at keyframes, therefore only the topology for keyframes is encoded. The topology is stored in synchronized meta-data, such as an SEI message.

At 1402, each component of each attribute is packed into a component of an image of a video. Geometry (x,y,z) deltas quantized on N bits are stored respectively in each component of a YUV 4:4:4 stream with N bits per component. UV deltas quantized on M bits are stored respectively in the first and second component of a YUV 4:4:4 stream with M bits per component, leaving the last component to 0. According to an embodiment wherein the 3D mesh comprises color associated to each vertex, color data is also packed into at least one component of an image of a video.

Figure 19:
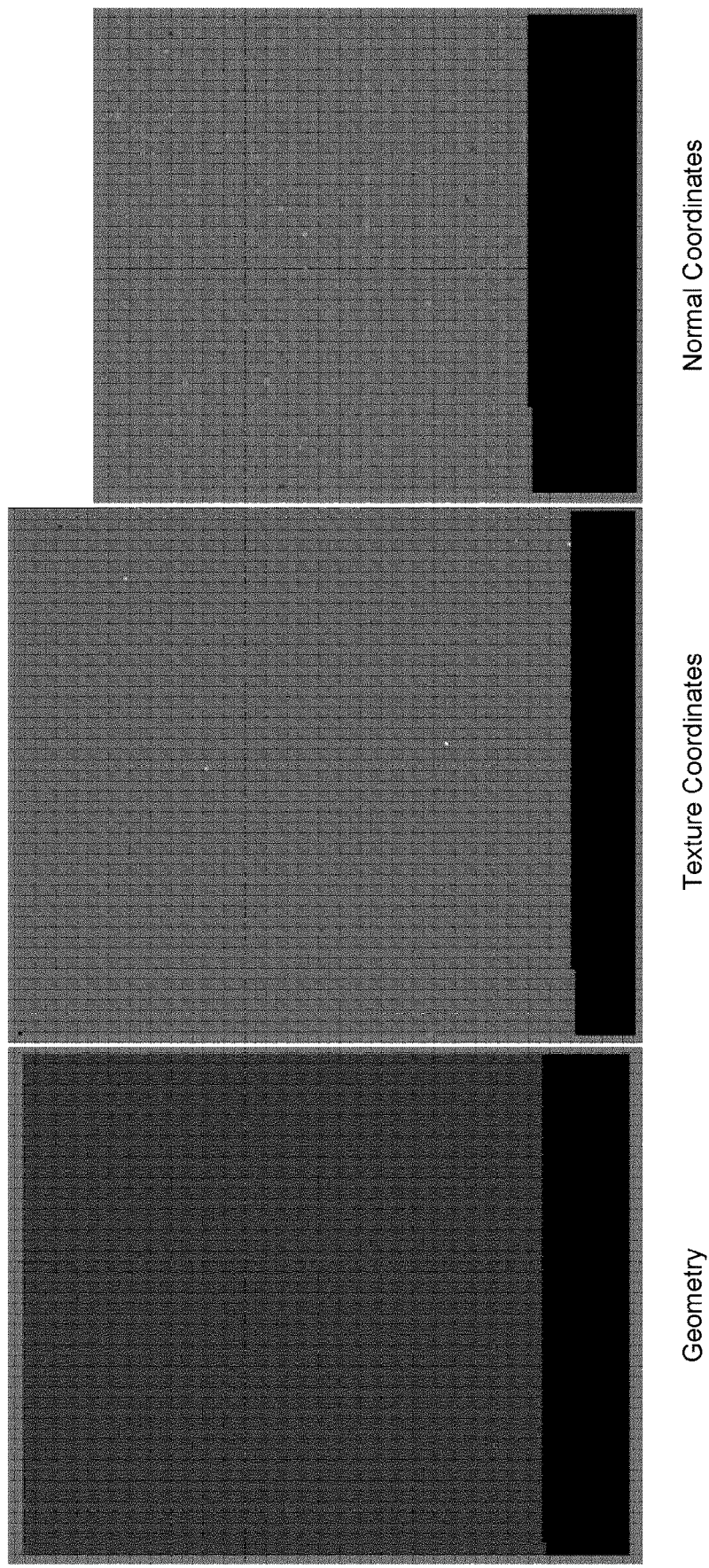
FIG. 19 illustrates an example of linear packing for the Ballerina model attributes in images planes for one frame.

More complex packing can be used. Octahedral normals coordinates quantized on 7 or 8 bits are encoded in the first and second component of a YUV 4:4:4 stream with 8 bits per component, leaving the last component to 0. More complex packing can also be used. FIG. 19 illustrates an example of linear packing for the Ballerina model attributes in images planes for one frame. From left to right, the attributes shown are the geometry delta (scaled by 3 for legibility) on 10 bits per component, the UV deltas on 10 bits per component and normal on 8 bits per component. FIG. 19 shows the sparse points of the profile curves as "hot spots" in the images.

According to another variant, the delta's geometry, UVs and normal components can also be spread into one video luminance component (Y) of a YUV video signal (e.g. 4:0:0 monochrome or 4:2:0). Such a variant allows the use, for instance, of the common 4:2:0 YUV video format used in distribution.

At 1404, the packed attributes are encoded. An HEVC or VVC video stream of the nearest (by higher value) available bit depth for each kind of attribute is created. All the frames of each attribute are encoded, producing one stream per attribute (geometry, texture coordinates, normal).

The attributes are encoded using lossless video-based encoding, such as an HEVC encoder, or a VVC encoder, or any other video-based encoder. Lossless encoding is used here for geometry, UV and normal coordinates as quantization begets uncontrolled shifts and distortion of the reconstructed 3D model.

According to an embodiment, a normal rebasing is performed on the normal coordinates before encoding. As explained above and shown in FIG. 13, the signal of the normal coordinates is split in two major parts (top and bottom). After the rebasing operation, the variance and deviations of the signal becomes quite low, and thus more compatible with a spatial coding. Such a rebasing operation can be performed in the following manner:

Let $N_{normal}$ the number of bits used to encode the normal, before reframing. Let $R_{normal}=\text{Power}(2, N_{normal})$ the numerical range, $Rh=R_{normal}/2$ half the numerical range. I,J the coordinates to rebase, (I',J') the rebased coordinates: If (I>Rh) I'=Rh+I-$R_{normal}$ else I'=Rh+I.

At the decoder, for reconstructing the normal signal, the reconstruction is performed by: if(I'>Rh)I=I'-Rh else I=Rh+I'.

Figure 20:
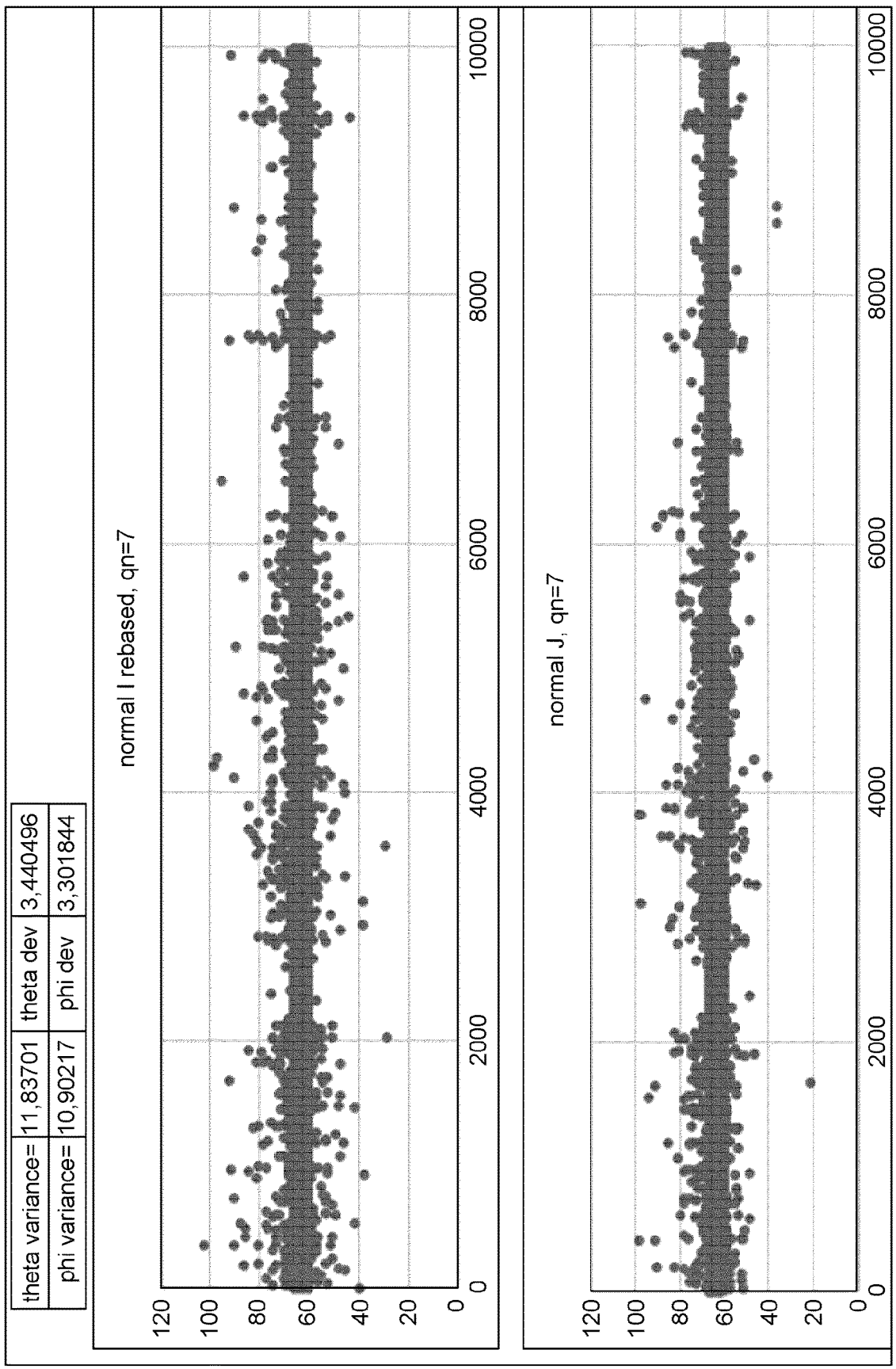
FIG. 20 illustrates an evolution of rebased normal in octahedron space for a given frame of the Ballerina model using Draco with CL=10 (with EdgeBreaker) and quantization step of 7 bits.

The same operations are performed for the J coordinates. FIG. 20 illustrates an evolution of rebased normal in octahedron space for a given frame of the Ballerina model using Draco with CL=10 (with EdgeBreaker) and quantization step of 7 bits. The x axis is the index of the value in the attribute table. The y axis is respectively the I and J values in the octahedron space.

According to an embodiment, a lossless quantization reframing scheme is applied to at least one component of an attribute before encoding. Such a reframing scheme is described below in reference with FIGS. 16 and 17. This lossless quantization reframing allows for further reducing payload or raising quality.

At 1405, the texture atlases are encoded using a video-based encoder, such as an HEVC encoder, or a VVC encoder, or any other video-based encoder.

At 1406, the bitstreams resulting from the encoding of the topology, of the attributes and the of the textures are multiplexed into one or more bitstreams for storing or streaming.

According to an embodiment, the bitstreams resulting from the encoding of the topology, of the attributes and the of the textures are embedded in a V-PCC bitstream using the V-PCC syntax.

Figure 15:
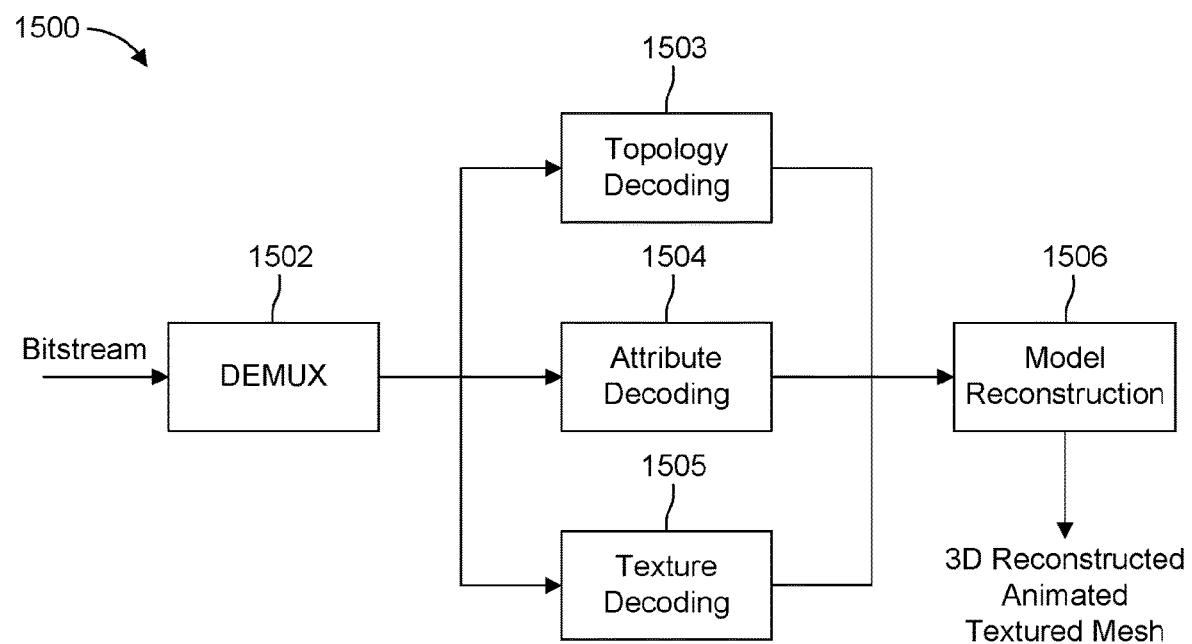
FIG. 15 illustrates an exemplary method for decoding a 3D object, according to an embodiment.

FIG. 15 illustrates an exemplary method 1500 for decoding a 3D object from a bitstream, according to an embodiment. For instance, the bitstream may be produced by the encoding method 1400 described in reference with FIG. 15.

At 1502, a bitstream comprising syntax elements for topology, textures and attributes of an animated 3D mesh is received. Data are eventually demultiplexed.

According to an embodiment, the received bitstream is compliant with V-PCC decoder syntax.

At 1503, the topology is decoded as metadata or video data depending of the implemented variant. At 1504, the attributes are decoded using a video-based decoder. According to an embodiment, an inverse lossless quantization reframing scheme is used as described below in reference with FIG. 18. At 1505, the textures atlases are decoded using a video-based decoder. At 1506, the 3D animated textured mesh is reconstructed from the decoded topology, decoded attributes and decoded textures.

Figure 21:
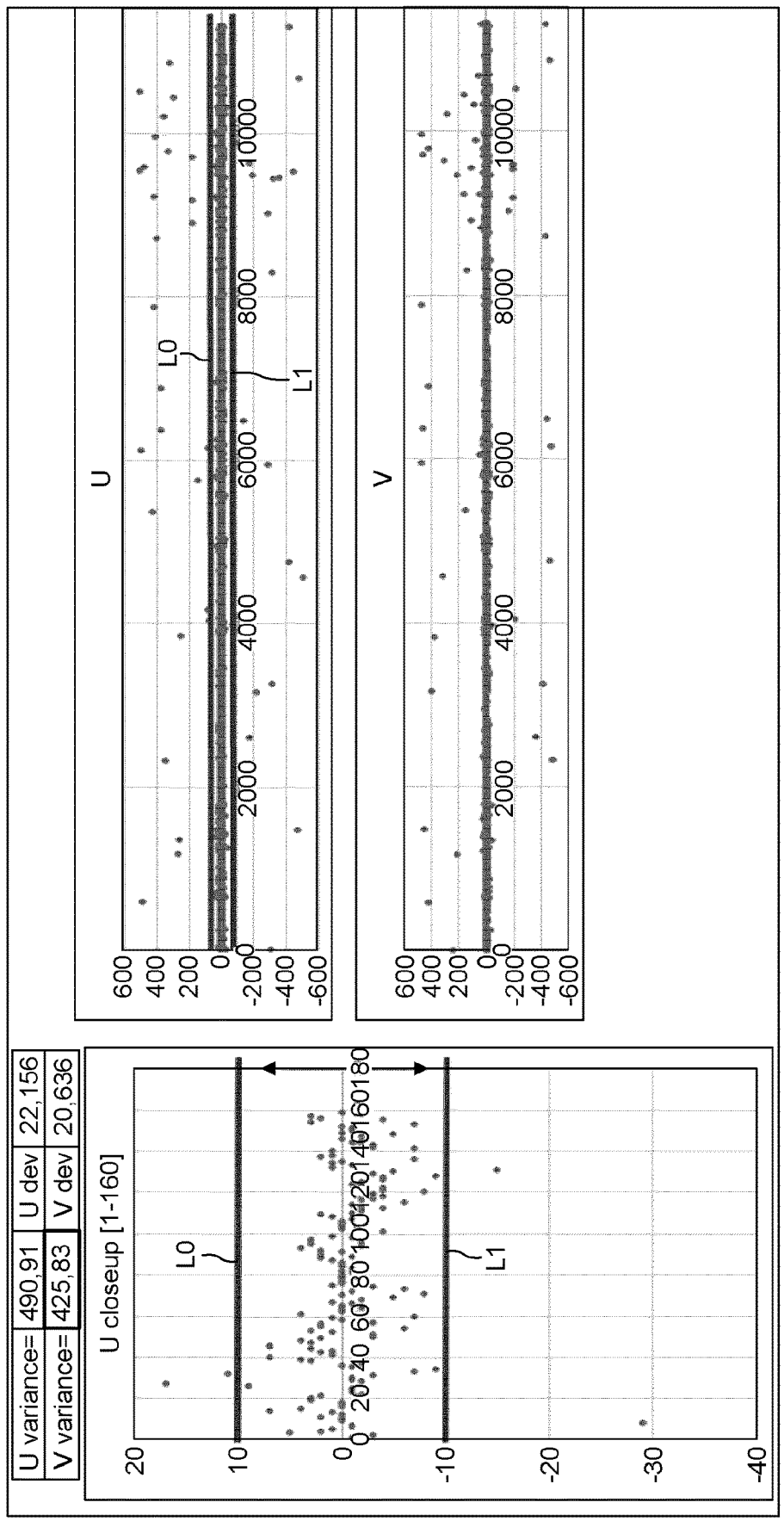
FIG. 21 illustrates an example of U,V signals and corresponding filtering for reframing, according to an embodiment.

As illustrated in FIGS. 7-12 and 20, most of the signals provided by the Edgedbreaker algorithm with CL=4 or CL=10, are highly centered on the origin with few values spread away. This property is use for splitting the data to encode in two parts, keeping the dense part on image compression but on a smaller bit range and coding the sparse part, eventually entropy coded, in a separate table, for instance stored as metadata or SEI message. In a variant, the spart part could also be coded as video data using a video-based encoded. FIG. 21 illustrate an example of U, V signals with a dense part between lines L0 and L1, a sparse part outside the lines L0 and L1. Such a splitting of the signal is also called reframing. An exemplary embodiment is described below.

Figure 16:
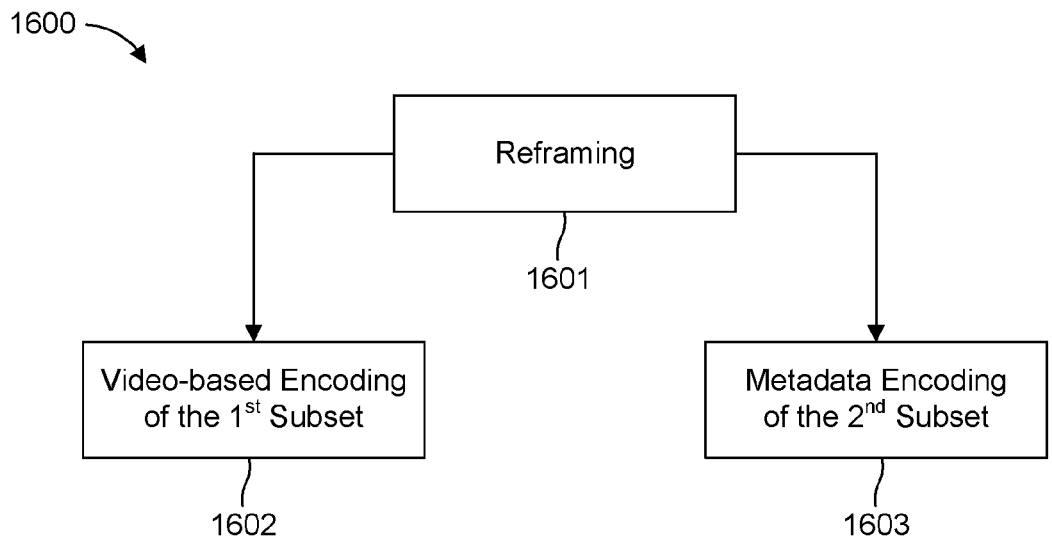
FIG. 16 illustrates an exemplary method for encoding at least one component of an attribute of an animated 3D object, according to an embodiment.

FIG. 16 illustrates an exemplary method 1600 for encoding at least one component of an attribute of an animated 3D mesh. The method 1600 is a lossless quantization reframing scheme that can be applied to any one of the component of an attribute of a 3D mesh, such as to x, y, or z components of the geometry, or to U, or V of the texture coordinates, or to I or J of the normal coordinates.

The at least one attribute comprises a set of values to be encoded. According to an embodiment, the values of the attribute are packed into a component of an image. However, the principle presented here can be applied to any representation of the set of values. For instance, the set of values can be represented in a 1D table.

At 1601, the set of values is reframed into a first subset of values and a second subset of values, as described with reference to FIG. 17.

Figure 17:
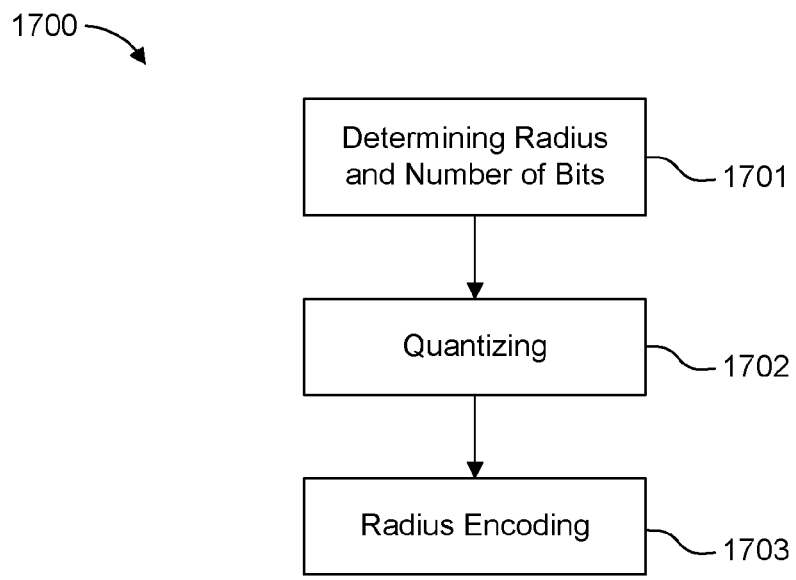
FIG. 17 illustrates an exemplary method for reframing values of a component of an attribute of an animated 3D object, according to an embodiment.

FIG. 17 illustrates an exemplary method for reframing values of a component of an attribute of an animated 3D mesh, according to an embodiment. The reframing method aims at splitting the input set of values into two subsets: a first subset comprising the dense part of the signal which is centered on the origin and a second subset comprising the sparse part of the signal. According to an embodiment, the first subset of values and the second subset of values are determined as a function of a radius parameter defining a range of values, said first subset of values comprising values of the set being in said range of values, and said second subset of values comprising values of the set being outside the range of values.

At 1701, a radius is determined. According to a variant, the radius can be determined as half the maximum deviation of the component. For instance, in the example of the signal represented in FIG. 21, a radius R=11 can be taken as the maximum values of U=22 and V=20 deviation divided by two. In other variant, the radius can be set manually.

The above determined radius R gives the radius that contains the biggest density (between the two lines L0 and L1). The dense part of the signal is thus determined as the part of the value lying in the range defined by the center of the signal plus and minus the radius, as illustrated in the closeup part in FIG. 21.

A number of bits for quantizing the first subset of values (dense part) without loss is determined as a function of the determined radius R. Let $Br=\lfloor \log_2(2*R) \rfloor+1$ the number of bits needed to encode the range. Br is the lossless re-quantization space needed to encode all the integer values in the range [−R,+R]. In the previous example, with R=11, Br=floor(log 2(22)+1)=5 bits, which gives a number R'=25=32 values.

According to an embodiment, the radius R is determined for each frame i. Each frame is then quantized using its own determined number of bits.

According to an embodiment, a distinct radius R is determined for each component of an attribute of the mesh. Each component of the attribute is thus quantized using its own determined number of bits.

According to another embodiment, a same radius R is determined for all the components of an attribute of the mesh. Thus, all the components of the attribute are quantized using a same determined number of bits. According to this variant, the same radius determined for all the components is determined as corresponding to the maximum radius among the radius determined separately for each component of the attribute.

According to another embodiment, a maximum of allowed sparse points is set such that the size of the radius is automatically raise if needed. Such a maximum of allowed sparse points could be computed on average compression results and optimized to give a best tradeoff between compressed re-framed deltas and raw sparse points.

At 1702, the values of the input signal lying in the range [−R,+R] are quantized on a number of Br bits. The values of the input signal that do not belong to the range [−R,+R] are stored in a separate table (the sparse-table) and their location in the input signal is also stored. This separate table forms the second subset of values.

According to an embodiment, the first subset of values is set to the input set of values, the values belonging to the range [−R,+R] are quantized on Br bits and the values being outside the range [−R,+R] are replaced with a determined value. For instance, for a value being outside the range [−R,+R], its original value in the first subset of value is replaced with the nearest value in the radius to enhance the spatial compression.

According to another embodiment, the values being outside the range [−R,+R] are removed from the first set of values. However, this embodiment leads to variable table size for each frame.

At 1703, the radius is encoded in the bitstream, for instance as a metadata syntax element.

At 1602, the first subset of values is encoded using a video-based encoder, for instance the encoder 200 described above.

At 1603, the second subset of values is encoded as metadata. The second subset of values, corresponding to the table of sparse points, contains, for each sparse point, its value coded on the original bit size plus its index in the original set of values. The index may be coded on a minimum number of bits needed to address the original data, before reframing. According to a variant, the sparse table is coded in a SEI (Supplemental Enhancement Information) message and can be raw or entropy coded. For instance, the second subset of values is encoded in an SEI using an HEVC, VVC or V-PCC encoder. According to another variant, the sparse table is coded as video data suing a video-based encoder.

According to another embodiment, as shown in FIG. 21, the sparse points are in opposite parts of the dense ones and thus the sparse points can also be losslessly re-framed over two sub spaces: the one under the dense space and the one above. The size of these sub spaces equals 1+(original bit range−Br)/2. According to this embodiment, the sparse table can be coded in two separate tables of the same size, for instance by rebasing the signal and reframing the rebased signal in a same manner as for the dense part. This embodiment is possible only if separate reframing has been performed for each component of the attribute.

Figure 18:
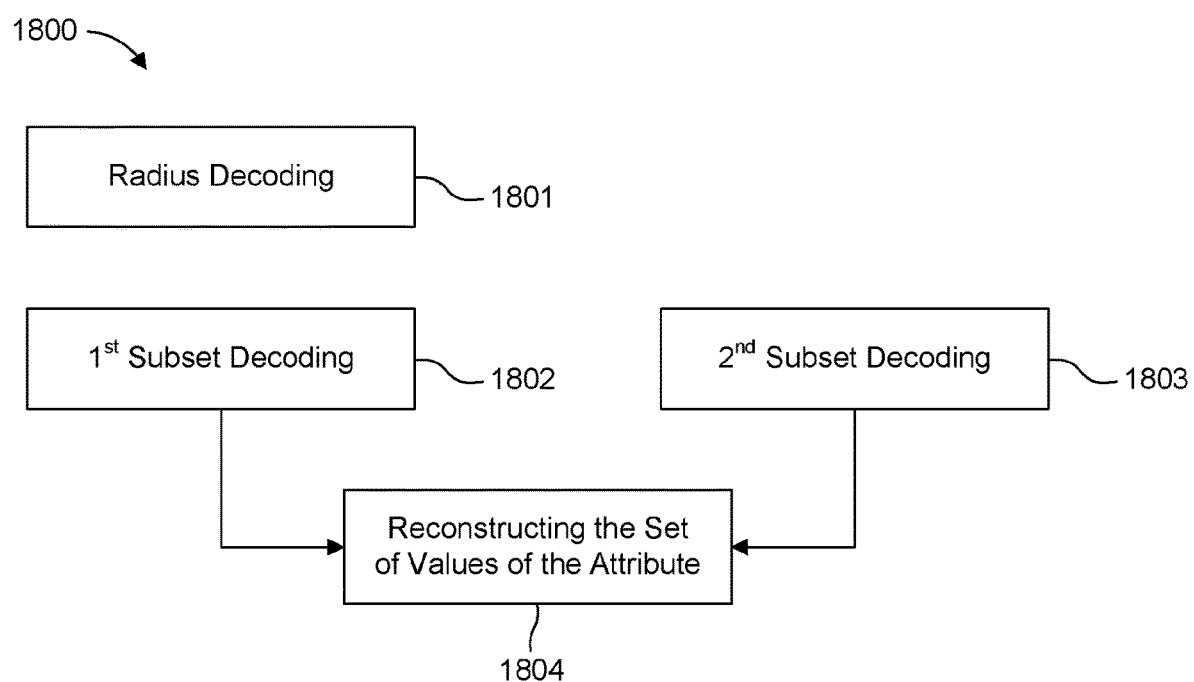
FIG. 18 illustrates a block diagram of an exemplary method for decoding at least one component of at least one attribute of an animated 3D object according to an embodiment.

FIG. 18 discloses a block diagram of an exemplary method 1800 for decoding at least one component of at least one attribute of an animated 3D object according to an embodiment. The at least one component of the at least one attribute is decoded from a bitstream previously encoded for instance using the method illustrated in FIG. 16.

At 1801, a radius parameter is decoded. The radius parameter defines a range of values onto which the values of the first subset have been quantized.

At 1802, the first subset of values of the component is decoded using a video-based decoder, such as for example the decoder 300. As described with FIG. 17, the first subset of values comprises the dense part of the signal. The values of the first subset are de-quantized according to decoded radius parameter.

At 1803, a second subset of values is obtained by decoding the entropy coded or raw-coded sparse table from the metadata of the bitstream, such as an SEI message. In a variant, the second subset of values is obtained by decoding the sparse table using a video-based decoder. The second decoded subset of values comprises the original values of the sparse part of the signal and the index of the sparse data in the original signal of the component of the attribute.

At 1804, the values of the component of the attribute are reconstructed from the first subset and the second subset. As the first subset is packed in a component of an image of a video, the first subset is unpacked from the image component.

According to an embodiment, the first subset comprises a same number of values as the component of the attribute. For reconstructing the component of the attribute, at each location of a value corresponding to a value from the second subset, the decoded value in the first subset is replaced with the corresponding value of the decoded second subset.

According to another embodiment, only the values of the first subset are packed into the component, i.e. values of the second subset have been removed from the component of the attribute for packing. For reconstructing the component of the attribute, at each location of a value corresponding to a value from the second subset, the corresponding value of the decoded second subset is inserted.

According to another embodiment, the component of the attribute is reconstructed on the fly when reconstructing the 3D animated object at 1506 in FIG. 15. The delta-table is set to the decoded first subset of values. Whenever an element of the delta-table is needed, the EdgeBreaker algorithm is modified to lookup the current point in the sparse table. If the stored index of the current point of the sparse table is equal to the current index in the delta-table, the value of the delta-table is skipped and the value from the sparse table is used. The pointer to the current point in the sparse table is increased. Otherwise, the value from the delta-table is read and used.

If the sparse-table is not too large, which is generally the case, the gain of lossless re-quantization is important: e.g. coding a model on 5 bits instead of 10 bits or 8 bits instead of 16 bits with no loss. Coding gain is achieved for the delta-data video coding with a minimal overhead with sparse-data storage in SEI.

According to another embodiment, one radius per component can be used, and thus different quantization per component if needed.

According to an embodiment, the values of the component of the attribute to encode/decode comprises residual values obtained from prediction by previously scanned values according to a scan order of the vertices of the mesh, as described in the Edgebreaker algorithm.

According to another embodiment, the radius is determined in a multi-pass encoding scheme.

According to this embodiment, a maximum value $R_m$ is determined over the radius $R_i$ determined separately for all frames I of the sequence or for a subset of the frames. According to this embodiment, the number of bits for all the frames or for a subset is thus set to $Br_m=\text{floor}(\log 2(2*R_m)+1)$.

According to another embodiment, when real-time encoding is needed, for instance for broadcasting, a forward approach can be envisioned for determining the radius. In this case, for each new frame, instead of using the deviations to determine an optimal bit depth, a fixed bit depth is used, for instance a bit depth that is user or application defined. All the values in this bit range are encoded using video coding and the remaining values are encoded in SEI messages, eventually using quantization reframing, as for the sparse points of the multi-pass solution.

According to an embodiment, the bitstream decoded in FIG. 15 is compliant with a V-PCC decoder. As illustrated in FIG. 22, the bitstream comprises a syntax element (reframe_flag) indicating whether reframing of all or parts of the attributes is enabled. According to a variant, a syntax element indicating whether reframing is enabled is set in the bitstream for each attribute.

The bitstream also comprises an information representative of at least one radius (radius). As described above, the radius can be set for each component of each attribute separately, in that case, the bitstream comprises an information representative of the radius for each component of each attribute attribute. Or the radius can be the same for all components of the attribute, in that case, the bitstream comprises an information representative of the radius for all components of the attribute. According to another embodiment, the radius can be the same for all attributes, in that case, the bitstream comprises an information representative of the radius for all attributes.

According to another embodiment, the radius can be changed in the sequence, for instance at each key frame. In this embodiment, the radius is thus signaled in the bitstream at each key frames.

FIG. 23A illustrates an example of a metadata encoded for the second subset. For each sparse table encoded as metadata, the metadata comprises a number (Num_sparsePts) of the sparse points encoded, the raw or entropy-coded values (SparsePtsValues) of the sparse points and their index (SparsePtsIndex) in the attribute. FIG. 23B illustrates an example of a metadata encoded for the second subset according to another embodiment wherein reframing is allowed for the sparse data. In the embodiment, the metadata also comprises a syntax element (RfS) indicating whether the sparse table is reframed. In the case the sparse table is reframed, the metadata thus comprises the size of the radius (Radius') for the reframed sparse-tables.

Figure 24:
FIG. 24 illustrates two remote devices communicating over a communication network according to an embodiment.

According to an example of the present principles, illustrated in FIG. 24, in a transmission context between two remote devices A and B over a communication network NET, the device A comprises a processor in relation with memory RAM and ROM which are configured to implement a method for encoding a 3D object as described in relation with the FIGS. 1-23B and the device B comprises a processor in relation with memory RAM and ROM which are configured to implement a method for decoding a 3D object as described in relation with FIGS. 1-23B.

In accordance with an example, the network is a broadcast network, adapted to broadcast/transmit a signal from device A to decoding devices including the device B.

A signal, intended to be transmitted by the device A, carries at least one bitstream generated by the method for encoding a 3D object according to any one of the embodiments described above.

Figure 25:
FIG. 25 illustrates an example of syntax of a signal transmitted over a packet-based transmission protocol according to an embodiment.

FIG. 25 shows an example of the syntax of such a signal transmitted over a packet-based transmission protocol. Each transmitted packet P comprises a header H and a payload PAYLOAD. According to embodiments, the payload PAYLOAD may comprise at least one of the syntax elements: coded image data representative of attribute values, coded metadata representative of attribute values, a syntax element indicating whether reframing of all or parts of the attributes is enabled, and eventually a radius size. The payload may also comprise any one of the syntax element discussed above.

Figure 26:
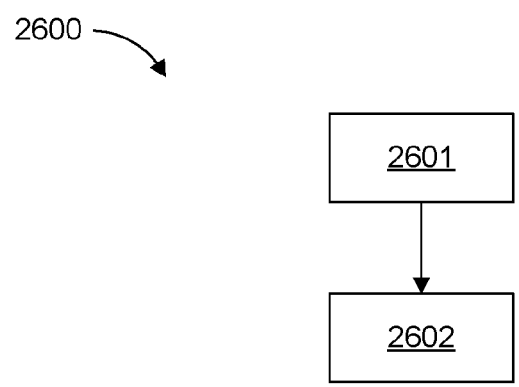
FIG. 26 illustrates an embodiment of a method for transmitting the signal according to an embodiment.

FIG. 26 illustrates an embodiment of a method (2600) for transmitting a signal according to any one of the embodiments described above. Such a method comprises accessing data (2601) comprising such a signal and transmitting the accessed data (2602) via a communication channel that may be implemented, for example, within a wired and/or a wireless medium. According to an embodiment, the method can be performed by the device 100 illustrated on FIG. 1 or device A from FIG. 24.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Moreover, the present aspects are not limited to VVC or HEVC, and can be applied, for example, to other standards and recommendations, and extensions of any such standards and recommendations. Unless indicated otherwise, or technically precluded, the aspects described in this application can be used individually or in combination.

Various numeric values are used in the present application. The specific values are for example purposes and the aspects described are not limited to these specific values.

Various implementations involve decoding. "Decoding," as used in this application, may encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input video sequence in order to produce an encoded bitstream.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a quantization matrix for de-quantization. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method, comprising encoding at least one component of at least one attribute of an animated 3D mesh wherein encoding comprises:
    obtaining an ordered sequence of residual prediction values of the at least one component of at least one attribute of the animated 3D mesh;
    reframing the residual prediction values of the ordered sequence into a first subset and a second subset, wherein the first subset comprises residual prediction values of the at least one component that are in a range of values, and the second subset comprises residual prediction values of the at least one component that are outside the range of values;
    encoding the first subset using a video-based encoder; and
    encoding the second subset as metadata.

2. An apparatus, comprising one or more processors, wherein the one or more processors are configured to encode at least one component of at least one attribute of an animated 3D mesh wherein encoding comprises:
    obtaining an ordered sequence of residual prediction values of the at least one component of at least one attribute of the animated 3D mesh;
    reframing the residual prediction values of the ordered sequence into a first subset and a second subset, wherein the first subset comprises residual prediction values of the at least one component that are in a range of values, and the second subset comprises residual prediction values of the at least one component that are outside the range of values;
    encoding the first subset using a video-based encoder; and
    encoding the second subset as metadata.

3. The apparatus of claim 2, wherein the second subset is encoded in an SEI message.

4. The apparatus of claim 2, wherein the ordered sequence of residual prediction values is obtained from an Edgebreaker algorithm.

5. The apparatus of claim 2, wherein the ordered sequence of residual prediction values is ordered according to an order in which vertices of the animated 3D mesh are visited for encoding a topology of the animated 3D mesh.

6. The method of claim 1, wherein reframing the residual prediction values of the at least one component of the at least one attribute into a first subset and a second subset comprises:
    determining the first subset and the second subset as a function of a radius parameter defining the range of values; and
    encoding the radius parameter.

7. The method of claim 6, wherein the radius parameter is determined as a half maximal deviation of the residual prediction values of the at least one component of the at least one attribute.

8. The method of claim 6, wherein a radius parameter is determined for each of at least two frames of the animated 3D mesh, and the range of values is determined as a function of a maximum value among the determined radius parameters.

9. The method of claim 1, wherein:
    the first subset comprises the residual prediction values of the at least one component of the at least one attribute and wherein at least one residual prediction value corresponding to a residual prediction value that belongs to the second subset is replaced in the first subset with a value determined from at least one value of the first subset; or
    the first subset comprises residual prediction values of the at least one component of the at least one attribute wherein residual prediction values that belong to the second subset are removed.

10. The method of claim 1, wherein encoding the second subset comprises encoding, for at least one residual prediction value of the second subset, a location of the at least one residual prediction value in the ordered sequence of residual prediction values of the at least one component of the at least one attribute.

11. The method of claim 1, wherein the at least one attribute comprises at least one of geometry coordinates of the 3D mesh, texture coordinates in a frame atlas, normal coordinates, color data, or generic data.

12. A non-transitory computer readable storage medium having stored thereon instructions for causing one or more processors to perform the method of claim 1.

13. A method, comprising decoding at least one component of at least one attribute of an animated 3D mesh wherein decoding comprises:
    decoding a first subset of values using a video-based decoder;
    decoding metadata representative of a second subset of values; and
    reconstructing an ordered sequence of residual prediction values of the at least one component of the at least one attribute from the values of the first subset and the values of the second subset, wherein the values of the first subset are in a range of values, and the values of the second subset are outside the range of values.

14. The method of claim 13, wherein decoding metadata representative of the second subset of values comprises decoding, for at least one value of the second subset, a location of the at least one value in the at least one component of the at least one attribute.

15. The method of claim 14, wherein reconstructing the at least one component of the at least one attribute from the first subset and the second subset comprises:
    replacing in the first subset of values, a value placed at a location of a value belonging to the second subset, with a corresponding value from the second subset; or
    inserting in the first subset of values, values from the second subset at a corresponding location.

16. An apparatus, comprising one or more processors, wherein the one or more processors are configured to decode at least one component of at least one attribute of an animated 3D object wherein decoding comprises:
    decoding a first subset of values using a video-based decoder;
    decoding metadata representative of a second subset of values; and
    reconstructing an ordered sequence of residual prediction values of the at least one component of the at least one attribute from the values of the first subset and the values of the second subset, wherein the values of the first subset are in a range of values, and the values of the second subset are outside the range of values.

17. The apparatus of claim 16, comprising:
    at least one of (i) an antenna configured to receive a signal, the signal including data representative of at least one part of an animated 3D mesh, (ii) a band limiter configured to limit the received signal to a band of frequencies that includes the data representative of the at least one part of the animated 3D mesh, or (iii) a display configured to display the at least one part of the animated 3D mesh.

18. The apparatus of claim 17, comprising a TV, a cell phone, a tablet, or a Set Top Box.

19. The apparatus of claim 16, wherein decoding metadata representative of the second subset comprises decoding, for at least one value of the second subset, a location of the at least one value in the at least one component of the at least one attribute.

20. A non-transitory computer readable storage medium having stored thereon instructions for causing one or more processors to perform the method of claim 13.

21. A non-transitory computer readable storage medium having stored thereon a bitstream comprising coded data representative of an ordered sequence of residual prediction values of at least one component of at least one attribute of an animated 3D mesh, the coded data comprising:

coded video data representative of a first subset of values of the at least one component; and coded metadata representative of a second subset of values of the at least one component, the at least one component being reframed into the first subset and the second subset, wherein the first subset comprises residual prediction values of the at least one component being in a range of values, and the second subset comprising residual prediction values of the at least one component being outside the range of values.

22. The non-transitory computer readable storage medium of claim 21, further comprising at least one of a radius parameter used for determining the first subset and the second subset or a syntax element indicating whether reframing of residual prediction values of the at least one component is enabled.

* * * * *